US00RE48446E

(19) United States
(12) Reissued Patent
Strong et al.

(10) Patent Number: US RE48,446 E
(45) Date of Reissued Patent: Feb. 23, 2021

(54) SYSTEM FOR CUTTING AND UNLOADING PORTIONS

(71) Applicant: John Bean Technologies Corporation, Chicago, IL (US)

(72) Inventors: John R. Strong, Redmond, WA (US); George R. Blaine, Lake Stevens, WA (US); Craig E. Pfarr, Issaquah, WA (US)

(73) Assignee: John Bean Technologies Corporation, Chicago, IL (US)

(21) Appl. No.: 16/590,663

(22) Filed: Oct. 2, 2019

Related U.S. Patent Documents

Reissue of:
(64) Patent No.: 9,778,651
Issued: Oct. 3, 2017
Appl. No.: 14/161,522
Filed: Jan. 22, 2014

(51) Int. Cl.
*G05B 19/418* (2006.01)
*A22C 17/00* (2006.01)
*B65G 47/91* (2006.01)

(52) U.S. Cl.
CPC ..... *G05B 19/4185* (2013.01); *A22C 17/002* (2013.01); *A22C 17/0073* (2013.01);
(Continued)

(58) Field of Classification Search
CPC ..... A22C 17/002; A22C 17/0086; A22C 17/0073; G05B 19/4185; G05B 2219/45044; G05B 2219/37558; G05B 2219/35162; B65G 47/912
USPC ..... 99/588, 589, 592, 537, 538, 539, 540, 99/545, 546, 548, 635, 643; 700/114, 700/223, 97, 173; 83/53, 177, 155.1; 248/121, 124.1, 124.2, 125.1, 125.7, 248/125.8, 125.9, 48, 248; 715/771;
(Continued)

(56) References Cited

U.S. PATENT DOCUMENTS 4,202,076 A * 5/1980 Rancatore ..... A22C 29/025 452/8
4,209,878 A * 7/1980 Albert ..... A22C 17/0086 452/134
(Continued)

FOREIGN PATENT DOCUMENTS

CA 2550972 C 1/2013
WO WO 2009020981 A1 * 2/2009 ..... B23D 47/045

*Primary Examiner* — William C Doerrler
(74) *Attorney, Agent, or Firm* — Christensen O'Connor Johnson Kindness PLLC

(57) ABSTRACT

A system (100) for cutting work product (104) into portions (P) and unloading the portions includes a conveyance system (102) for carrying the workpieces and portions, as well as a scanner (110) for scanning the work products. A cutter system (120) composed of cutter assemblies (122) carried by carrier systems (124) may be arranged in an array or series along the conveyance system for cutting, trimming, and portioning the work products (104) into end pieces (P) of desired sizes or other physical parameters. An unloading system (130) composed of one or more unloading assemblies/units/apparatus (132) are carried by the same carrier systems (124) used to carry the cutter assemblies (122) to pick up the portioned pieces (P) and either move them to a different location or replace the portioned workpieces back onto the conveyance system after the trim of the workpiece has been removed.

36 Claims, 14 Drawing Sheets

(52) U.S. Cl.
CPC ..... *A22C 17/0086* (2013.01); *A22C 17/0093* (2013.01); *B65G 47/912* (2013.01); *G05B 2219/35162* (2013.01); *G05B 2219/37558* (2013.01); *G05B 2219/45044* (2013.01)

(58) Field of Classification Search
USPC ..... 452/150, 157, 171, 134, 184; 198/339.1, 198/536.1
See application file for complete search history.

(56) References Cited

U.S. PATENT DOCUMENTS 4,876,934 A * 10/1989 Fagan ..... A21C 11/12 425/142
5,031,496 A * 7/1991 Lobash ..... A22C 25/18 83/102
5,205,779 A * 4/1993 O'Brien ..... A22B 5/0005 452/155
5,243,886 A * 9/1993 Rudy ..... B26D 3/18 83/177
5,334,084 A * 8/1994 O'Brien ..... A22B 5/0005 452/134
5,365,816 A * 11/1994 Rudy ..... A21C 11/10 83/177
5,514,032 A * 5/1996 Young ..... A22B 5/0035 452/136
5,539,987 A 7/1996 Zennyoji
5,746,566 A * 5/1998 Pfarr ..... B26F 1/3806 414/744.5
5,868,056 A * 2/1999 Pfarr ..... B23Q 1/621 83/177
RE36,664 E * 4/2000 O'Brien ..... A22B 5/0005 452/149
6,098,512 A * 8/2000 Life ..... B26D 3/10 83/286
6,339,969 B1 * 1/2002 Salcudean ..... B25J 9/106 74/490.01
6,826,989 B1 12/2004 Wattles ..... A22C 17/0093 83/102
6,983,678 B2 1/2006 Wattles
7,007,807 B1 3/2006 Stockard
7,500,550 B2 * 3/2009 Strong ..... A22C 7/00 198/334
7,793,896 B2 * 9/2010 Pfarr ..... B26F 3/004 248/121
7,949,414 B2 * 5/2011 Blaine ..... B26D 3/10 198/341.04
7,976,368 B2 * 7/2011 Haucke ..... A22C 17/008 452/184
8,233,668 B2 * 7/2012 Jing ..... G06K 9/342 382/110
8,549,996 B2 * 10/2013 Pryor ..... A23N 15/003 83/177
2002/0067797 A1 * 6/2002 Safai ..... A22C 17/0086 378/54
2004/0267403 A1 12/2004 Itoh
2007/0208455 A1 9/2007 Bollegraaf et al.
2008/0289515 A1 * 11/2008 Knorr ..... A23N 15/02 99/640
2009/0038455 A1 * 2/2009 Strong ..... B23D 47/045 83/155.1
2009/0137195 A1 * 5/2009 Bottemiller ..... A22C 17/008 452/150
2009/0143886 A1 * 6/2009 Blaine ..... A22C 17/0086 700/97
2010/0126320 A1 * 5/2010 Macomber ..... B26D 7/1863 83/24
2010/0179684 A1 * 7/2010 Blaine ..... B07C 5/342 700/223
2011/0293797 A1 * 12/2011 Pryor ..... A23N 15/003 426/231
2013/0340580 A1 * 12/2013 Strong ..... B26D 5/007 83/13

* cited by examiner

SYSTEM FOR CUTTING AND UNLOADING PORTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*The present application is a reissue application of U.S. Pat. No. 9,778,651, issued Oct. 3, 2017, the disclosure of which is incorporated herein by reference.*

FIELD OF THE INVENTION

The present invention relates generally to an apparatus for portioning and/or trimming workpieces, and more particularly to an apparatus for portioning or trimming workpieces by shape, weight, or other physical parameter and then automatically off-loading the portioned workpieces.

BACKGROUND OF THE INVENTION

Workpieces, including food products, are cut or otherwise portioned into smaller portions by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on a conveyor belt and a determination is made through the use of a computer as to how best to portion the chicken breast to the weights desired by the customer, so as to use the chicken breast most effectively.

Portioning and/or trimming of the workpiece can be carried out by various cutting devices, including high-speed water jet cutters or rotary or reciprocating blades, as the food product continues to travel on the conveyor. Once the portioning/trimming has occurred, the resulting portions are off-loaded from the conveyor by hand to be placed on a second takeaway conveyor for further processing or, perhaps, to be placed in a storage bin. The manual off-loading of portioned pieces is often unsatisfactory because it is difficult for the worker to visually distinguish between portions that might vary by only a few ounces. As a result, the portioned piece may be placed onto the wrong conveyor or into the wrong storage bin. Also, the portioning of food products, especially fish, poultry or meat, typically occurs at relatively low temperatures, in the range of 40 degrees. Performing the same repetitive off-loading tasks in this cold environment can lead to physical ailments as well as creating an undesirable work environment. As such, relatively high worker turnover is not uncommon.

Automated systems have been developed for picking up portioned pieces and offloading the portioned pieces into a second takeaway conveyor, a takeaway chute, a storage bin, etc. Such offloading systems are located downstream of the location of the portioning/trimming cutters. Oftentimes, a significant number of offloader units are required to keep pace with the portioning/trimming cutters when seeking to maximize throughput. Also, a separately activated carrier system is used for the offloading units.

The present invention seeks to increase the accuracy (and thereby reduce the level of human error) with which cut portions are categorized and also potentially to increase the throughput of portioning machines while at the same time keeping the equipment requirements of such machines to a minimum. The present disclosure also seeks to provide flexibility to change or alter the number of portioning cutters and/or offloader units to better match the types of portioning occurring, including the number of portions being cut from a workpiece. It will be appreciated that if two breast pieces are cut from a chicken breast, the offloading requirements are not nearly as onerous as opposed to if the chicken breast is being cut into nuggets, resulting in numerous nuggets per chicken breast workpiece.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for cutting portions from a workpiece and then unloading the cut portions to separate the cut portions from the remaining workpiece trim comprises a conveyance system for conveying the workpiece, a scanning system for scanning the workpiece, a cutting system for cutting portions from the workpiece, a carrier system for moving the cutting system laterally and longitudinally of a conveyance system along cutting paths to cut the workpiece into desired shapes and/or sizes, and an unloading system operably associated with the carrier system operable to remove the cut portions from the conveyance system. The system further includes a control system processor operable to process the scanning data and portion specification settings to determine what cutting paths are required to achieve a desired shape and/or size portions from the workpiece. The control system also directs the cutting system to perform the required cuts and directs the unloading system to pick up the cut portions and deposit the cut portions at desired locations based on the known location of the cut portions, as determined in the scanning and cutting steps.

The carrier system includes an X-Y gantry system disposed over the conveyance system, wherein the cutting system is mounted on a powered carriage of the gantry system. The unloading system is also carried by an X-Y gantry system. In accordance with a further aspect of the present invention, the unloading system is mounted on the same carriage on which the cutting system is mounted.

In accordance with a further aspect of the present invention, the cutting system is carried by a rotatable and extendible actuator located alongside the conveyance system. The unloading system is operably associated with the actuator used to carry the cutting system.

In accordance with a further aspect of the present invention, the unloading system is carried by the same type of actuator used for carrying the cutting system. In a further aspect of the present invention, the unloading system is carried by the same actuator used to carry the cutting system.

In accordance with a further aspect of the present invention, the carrier system comprises an automated, multi-directional actuator capable of moving at least along, across, and diagonally relative to the conveyance system. In accordance with a further aspect of the present invention, the actuator system is also capable of moving upward and downward relative to the conveyance system.

In accordance with a further aspect of the present invention, the unloading system comprises at least one vacuum-operated actuator for attaching to the cut portions.

In accordance with a further aspect of the present invention, the at least one vacuum actuator comprises a vacuum head for attaching to the cut portions and connectable to a vacuum stream in fluid communication with the vacuum head. A separation screen is positioned between the vacuum head and the vacuum stream, and a pressurized fluid is directable at the separation screen in a direction toward the vacuum head so as to remove debris from the separation screen.

In accordance with a further aspect of the present invention, a plurality of vacuum actuators is arranged in sets for use in unloading a plurality of cut portions from the conveyance system simultaneously.

In accordance with a further aspect of the present invention, the unloading system comprises a suction head connectable in suction flow communication with a source of suction. The suction head has an inlet of a minimum size large enough to enable the cut portions to pass through the suction head for removing the cut portions from the conveyance system.

In accordance with a further aspect of the present invention, the control system is operable to direct the cutting system to cut the work product and then direct the operation of the unloading system to pick up the cut portions of the work product from the conveyance system before the cut portions travel beyond range of the carrier system on which the cutting system and corresponding unloading system are mounted.

In accordance with a further aspect of the present invention, the cutting system can be replaced with one or more unloading systems, and the unloading system can be replaced with one or more cutting systems.

In accordance with a further aspect of the present invention, a trim sweep system is provided to remove the trim relative to the conveyance system to one or more desired locations on the conveyance system and/or to one or more locations off of the conveyance system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application includes references to directions, such as "forward," "rearward," "upward," "downward," "extended," "advanced," and "retracted." These references and other similar references in the present application are only to assist in helping describe and understand the present invention and are not intended to limit the present invention to these directions. Also, references to "work product," "workpiece," "food product," "food piece," "portion" are understood to be interchangeable and are not meant to be limiting in nature.

In the following description, various embodiments of the present disclosure are described. In the following description and in the accompanying drawings, the corresponding systems assemblies, apparatus and units are identified by the same part number, but with an alpha suffix. The descriptions of the parts/components of such systems assemblies, apparatus and units that are the same or similar are not repeated so as to avoid redundancy in the present application.

Overall System

Figure 1:
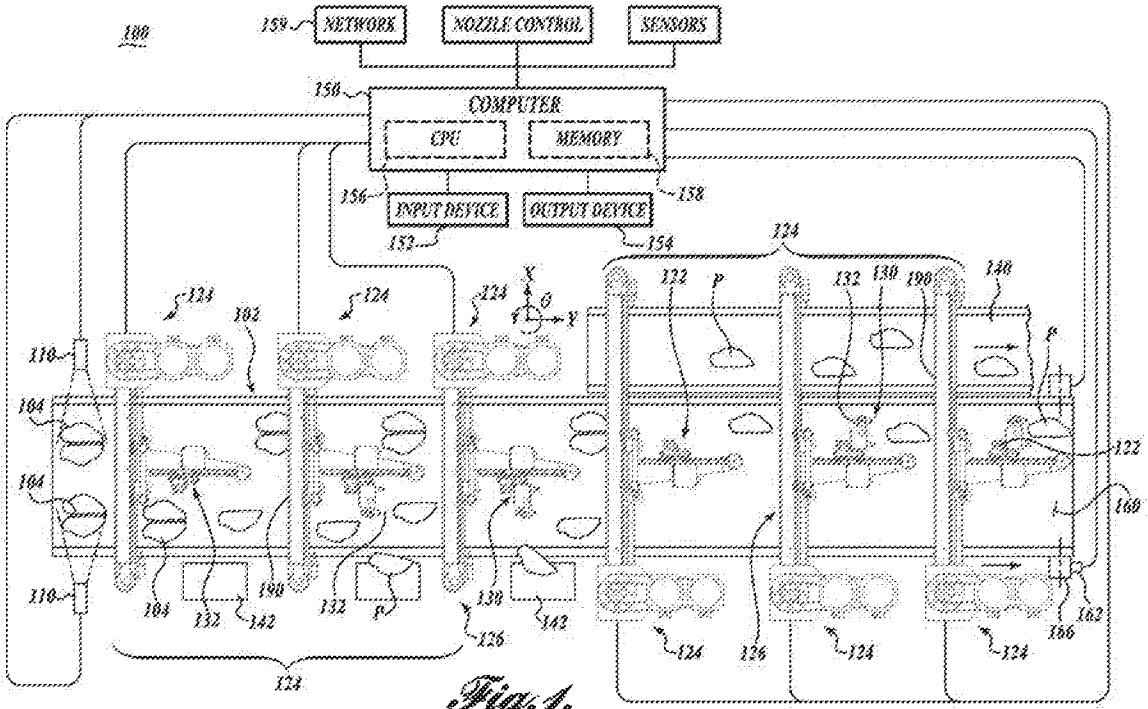
FIG. 1 is a top schematic view of a system for cutting and unloading portions in accordance with the present disclosure.

FIG. 1 schematically illustrates a system 100 for cutting and unloading portions suitable for implementing an embodiment of the present disclosure. The system 100 includes a moving support surface in the form of a conveyance system 102 for carrying work products 104, which may be arranged in multiple lanes or windrows, extending along the conveyance system, to be trimmed and/or cut into portions P. The work products 104 may be a food product, such as meat, poultry, or fish, that are spaced along the conveyance system. Other types of work products may include items composed of, for example, fabric, rubber, cardboard, plastic, wood or other types of material spaced along the conveyance system.

In a scanning aspect of the present disclosure, the system 100 includes a scanner 110 for scanning the work products 104. In a cutting/trimming/portioning aspect of the present disclosure, the system 100 includes a cutter system 120 composed of one or more cutter assemblies/units/apparatus 122, which may be arranged in an array or series of cutter assemblies, for cutting/trimming/portioning the work products 104 into end pieces P of desired sizes or other physical parameters. The cutter assemblies 122 are carried by a powered carrier system 124 to move the cutter assemblies longitudinally and laterally relative to the conveyance system.

In an unloading aspect of the present disclosure, an unloading system 130 composed of one or more unloading assemblies/units/apparatus 132 are operatively associated with carrier system 124. In this regard, the unloading system may be carried by the same type of carrier system used to carry the cutter assemblies 122. In a specific, but an optimal embodiment of the present disclosure, the unloading assembly 130 may actually be carried by the same carrier used to carry a cutter assembly 122. The unloading system 130 picks up the cut portions P from the conveyance system 102 and transfers the cut portions to takeaway locations, which could include side conveyors 140, chutes 142, or other locations away from the conveyance system. Alternatively, the unloading system 130 may pick up the portioned workpieces P so that the remaining workpiece trim can be removed, and then replace the portioned workpieces onto the conveyance system at a location closely corresponding to the location from which the portioned workpieces were initially picked up by the unloading system.

The conveyor system 102 and scanner 110, cutting system 120, carrier system and unloading system 130, are coupled to and controlled by a processor or computer 150. As illustrated in FIG. 1, the processor/computer 150 includes an input device 152 (keyboard, mouse, touchpad, etc.) and an output device 154 (monitor, printer). The computer 150 also includes a CPU 156 and at least one memory unit 158. Rather than using a single processor or computer, one or more of the conveyor systems, scanners, cutting systems, carrier system and/or unloading system may utilize its own processor or computer. Also, processor/computer may be connected to a network 159 that ties system 100 to other aspects of the processing or workpieces 104, such as downstream processing of portions P.

Generally the scanner 110 scans the work products 104 to produce scanning information representative of the work products 104, and forwards the scanning information to the processor/computer 150. The processor/computer, using a scanning program, analyzes the scanning data to determine the location of the work products on the conveyance system and develop a length, width, area, and/or volume distribution of the scanned work product. The processor/computer 150 may also develop a thickness profile of a scanned work product. The processor/computer 150 can then model the work product to determine how the work product may be divided, trimmed, and/or cut into end pieces P composed of specific physical criteria, including, for example, shape, area, weight, and/or thickness. In this regard, the processor/computer 150 takes into consideration that the thickness of the work product may be altered, either before or after the work product is cut by the cutter system 120, or by a slicer, not shown. The processor/computer 150 using the scanning program or portioning program, determines how the work product may be positioned into one or more end piece product sets. The processor/computer using the portioning software then functions as a controller to control the cutter system 120 to portion the workpiece 104 according to the selected end product/pieces P, and then control the unloading system 130 to remove the portioned workpieces P from the conveyance system and place the portioned workpieces at one or more desired locations, either away from the conveying system, or back on the conveying system after the trim has been removed.

Conveyance System

Referring specifically to FIGS. 1, 2, 12, and 13, the conveyance system 102 includes a moving belt 160 that slides over an underlying support or bed 164. The belt 160 is driven by drive rollers carried by a frame structure (not shown) in a standard manner. The drive rollers are in turn driven at a selected speed by a drive motor 166, also in a standard manner. The drive motor 166 can be composed of a variable speed motor to thus adjust the speed of the belt 160 as desired as the work product 104 is carried past scanner 110, cutter system 120 and offloading system 130.

An encoder 162 is integrated into the conveyance system 102, for example, at drive motor 166 to generate electrical pulses at fixed distance intervals corresponding to the forward movement of the conveyor belt 160. This information is routed to processor/computer 150 so that the location(s) of the particular work product 104, or the portions P cut from the work product, can be determined and monitored as the work product or portions travel along system 100. This information can be used to position cutter assembly 122 and unloading assembly 132, as well as for other purposes.

Scanning

Describing the foregoing system 100 and corresponding method in more detail, the conveyor 102 carries the work products 104 beneath the scanning system 110. The scanning system may be of a variety of different types, including a video camera (not shown) to view the work products 104 illuminated by one or more light sources. Light from the light source 168 is extended across the moving conveyor belt 160 of the conveying system 102 to define a sharp shadow or light stripe line, with the area forwardly of the transverse beam being dark. When no work product 104 is being carried by the conveyor belt 160, the shadow line/light stripe forms a straight line across the conveyor belt. However, when the work products 104 pass across the shadow line/light stripe, the upper, irregular surface of the work product produces an irregular shadow line/light stripe as viewed by a video camera angled downwardly on the work product and the shadow line/light stripe. The video camera detects the displacement of the shadow line/light stripe from the position it would occupy if no work product were present on the conveyor belt 160. This displacement represents the thickness of the work product along the shadow line/light stripe. The length of the work product is determined by the distance of the belt travel that shadow line/light stripes are created by the work product. In this regard, the encoder 162 integrated into the conveyance system generates pulses at fixed distance intervals corresponding to the forward movement of the conveyor belt 160.

In lieu of a video camera, the scanning station may instead utilize an X-ray apparatus (not shown) for determining the physical characteristics of the work product, including its shape, mass, and weight. X-rays may be passed through the object in the direction of an X-ray detector (not shown). Such X-rays are attenuated by the work product in proportion to the mass thereof. The X-ray detector is capable of measuring the intensity of the X-rays received thereby, after passing through the work product. This information is utilized to determine the overall shape and size of the work product 104, as well as the mass thereof. An example of such an X-ray scanning device is disclosed in U.S. Pat. No. 5,585,603, incorporated by reference herein. The foregoing scanning systems are known in the art and, thus, are not novel per se. However, the use of these scanning systems, in conjunction with the other aspects of the described embodiments, is believed to be new.

The data and information measured/gathered by the scanning device(s) are transmitted to the processor/computer 150, which records and/or notes the location of the work products 104 on the conveyor, as well as data pertaining to, inter alia, the lengths, widths, and thicknesses of the work products about the entire work products. With this information, the processor, operating under the scanning system software, can develop an area profile as well as a volume profile of the work products. Knowing the density of the work products, the processor can also determine the weight of the work products or segments or sections thereof.

Although the foregoing description discusses scanning by use of a video camera and light source, as well as by use of X-rays, other three-dimensional scanning techniques may be utilized. For example, such additional techniques may be by ultrasound or moiré fringe methods. In addition, electromagnetic imaging techniques may be employed. Thus, the present invention is not limited to the use of video or X-ray methods, but encompasses other three-dimensional scanning technologies.

Carrier System

Carrier system 124 is illustrated in FIGS. 1-5 and 8 as composed of a plurality of carrier assemblies/units/apparatus 126 spaced along the conveyance system 102. The carrier assemblies 126 are adapted to carry and move cutter systems 120 and unloading systems 130, together or separately, relative to the conveyance system 102.

Referring specifically to FIGS. 2-5 and 8, the carrier assemblies 126 in basic form includes a gantry 170 extending across the conveyance system 102 for supporting and guiding a carriage 172 for movement transversely to the direction of movement of the conveyor belt. The carriage 172 is powered by a drive system including, in part, the motive system 174 and a drive train 176. A second, longitudinal support structure or beam 178 is cantilevered outwardly from the carriage 172 in a direction generally aligned with the direction of movement of the conveyor belt 160. A second longitudinal carriage 180 is adapted to move along the beam structure 178 by a drive system which in part includes the motive system 174, to power the longitudinal carriage 180 through the drive train 176. A cutter assembly 122 and an unloading assembly 132 are mounted on the carriage 180 to move longitudinally of the conveyor belt 160, as the cutter assembly operates on the underlying work products 104 being carried by the conveyance system, and also while the unloading assembly 132 is used to pick up the portioned workpieces P and move the portioned workpieces to a desired location.

Figure 2:
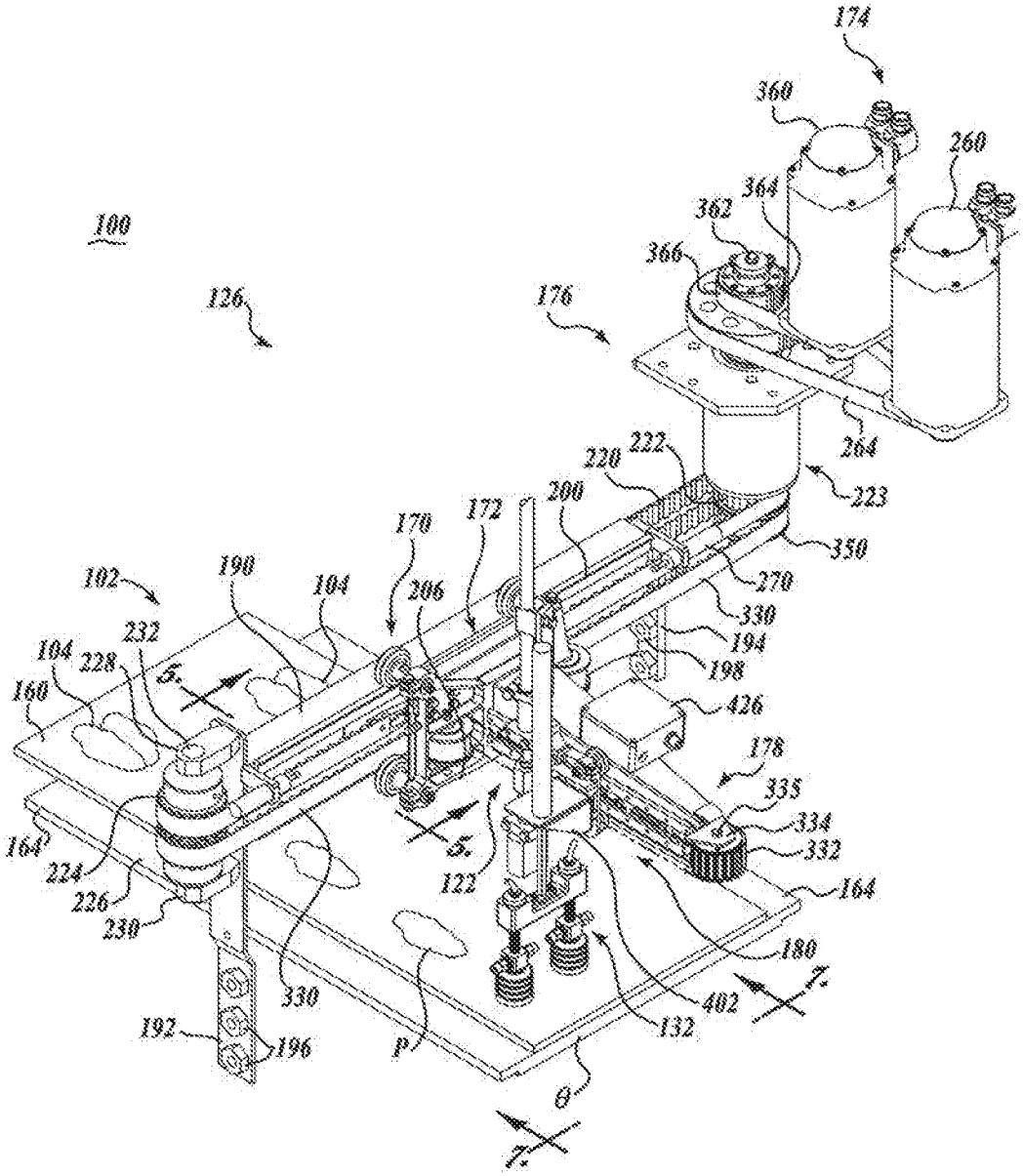
FIG. 2 is a pictorial view of a carrier system for a cutter system and unloading system.

The gantry 170 is composed of a support structure 190 that spans transversely across the conveyor belt 160 at an elevation spaced above the belt. The support structure 190 can be composed of a hollow, rectangular construction, but may be formed in other manners and shapes without departing from the spirit or scope of the present invention. The ends of support structure 190 are supported by elongated upright brackets 192 and 194. As shown in FIG. 2, bracket 192 is fixed to the adjacent ends of the support structure 190 to extend downwardly for mounting relative to conveyor system 102. A plurality of hardware members 196 extend through clearance holes (not shown) formed in the lower, offset portion of bracket 192 to attach the bracket to the conveyor system or to a frame structure for the conveyor system. Bracket 194 extends downwardly from the opposite end of the support structure for attachment relative to the conveyor system or frame thereof. In this regard, hardware members 198 extend through clearance holes provided in the lower end of bracket 194 to attach the bracket to the conveyor or frame. In this manner, the support structure 190 is mounted securely and stationarily relative to the conveyor system or the frame therefor.

Figure 5:
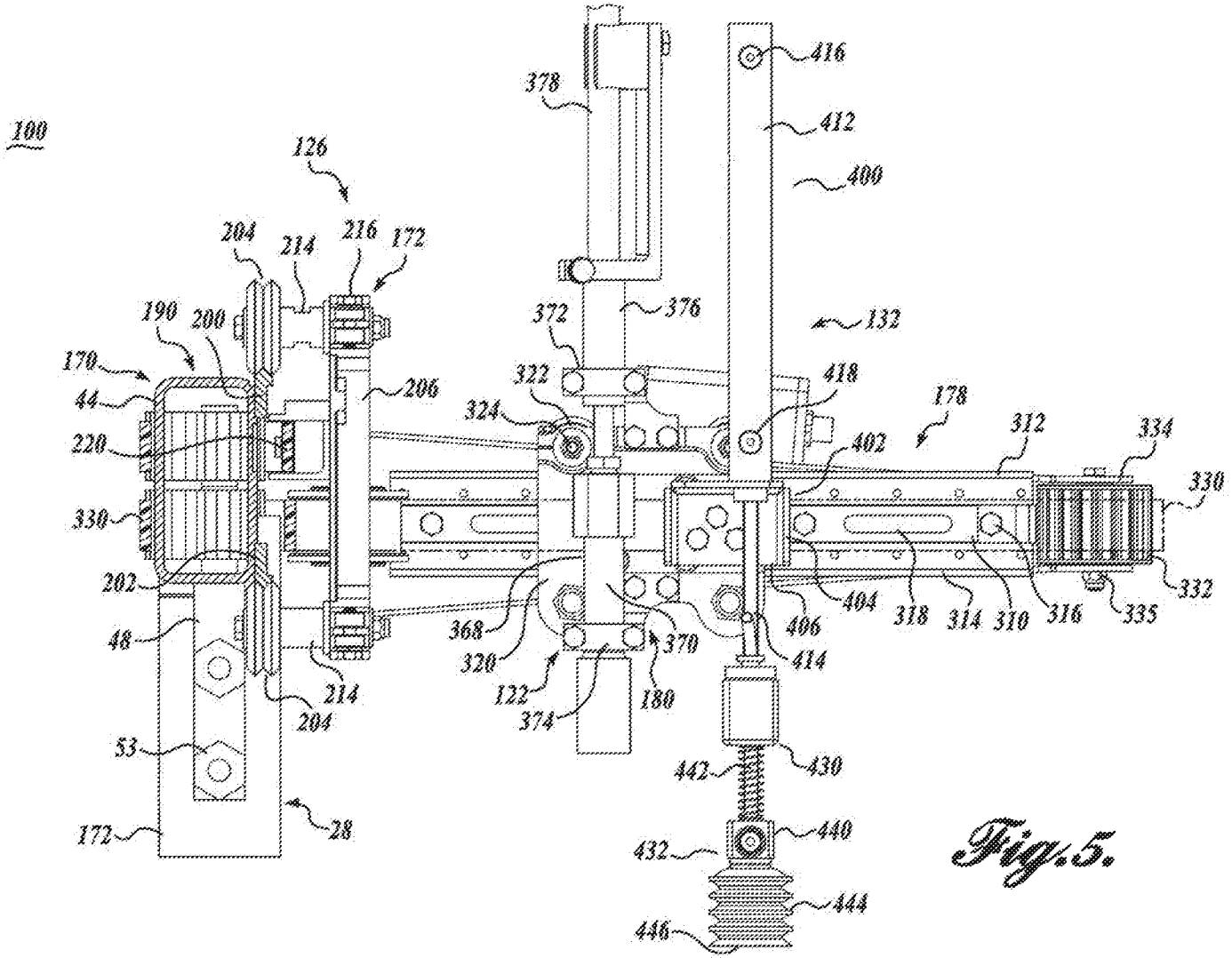
FIG. 5 is an elevational view of a portion of FIG. 2 partially in cross-section.

Gantry 170 also includes a track for guiding transverse carriage 172 along support structure 190, composed of an upper rail 200 and the lower rail 202 attached to the face of the support structure facing the carriage. As illustrated in FIG. 5, the upper rail 200 extends along the upper corner of the support structure whereas the lower rail 202 extends along the lower corner of the support structure. As also illustrated, the upper surface of the upper rail and the lower surface of the lower rail are crowned to engage with the concave outer perimeters of rollers 204 of carriage 172. As such, the carriage 172 is held captive on the track while traveling back and forth along the support structure.

As illustrated in FIGS. 2-5 and 8, carriage 172 includes a substantially planar, generally rectangularly shaped bed portion 206 having a reinforced outer perimeter for enhanced structure integrity. The carriage rollers 204 are attached to the corners of the bed 206 by stub axles 214 which engage within through-bores formed in bosses 216 which extend transversely from each of the four corners of the carriage bed 206. Antifriction bearings (not shown) are utilized between the rollers 204 and the stub axles 214 to enhance the free rolling of carriage 172 along support structure 190.

Carriage 172 is powered to move back and forth along support structure 190 by motive system 174. In this regard, a timing belt 220 extends around a driven pulley 222 located at the lower end of drive shaft assembly 223 of motive system 174 and also around an idler pulley 224 of an idler assembly 226 mounted on the upper end of bracket 192 by upper and lower bracket ears 228 and 230. As such, the belt 220 makes a loop around the support structure 190, extending closely along the sidewalls of the structure. The idler pulley 224 is adapted to rotate freely about central shaft 232 of the idler assembly 226 through the use of an antifriction bearing (not shown) with the upper and lower ends of the shaft being retained by bracket ears 228 and 230.

The belt 220 is connected to the backside of carriage bed 206. As most clearly shown in FIG. 4, a spring-loaded clamping structure 240 connects the belt 220 to the carriage bed 206 so that if the carriage becomes jammed or locked along the support structure, if the carriage 172 is ever in a "runaway" condition or if motive system 174 malfunctions tending to cause the carriage to overrun support structure 190, the belt 220 can slide or move relative to the carriage 172. As such, potential damage to cutter apparatus 122 and unloader apparatus 132 may be avoided or at least minimized.

The clamping structure 240 includes a base or back block 242 mounted to the back face of the carriage bed 206. A face plate 244, mounted to the back block 242, is resiliently clamped against the toothed surface of belt 220. The surface of face plate 224 interfacing with the belt 220 is ridged to match the contours of the belt 220. Normally the clamping force that clamps the face plate 244 to the block 242 securely clamps the belt 220 to the clamping structure. However, if the tension in the belt 220 extends a certain level, then the belt 220 is able to slip relative to the clamping structure.

Referring to FIG. 2, the motive system 174 includes a servo motor 260 programmable to control the movement of the carriage 172 back and forth along support structure 190 as desired. The servo motor 260 is positioned at a location substantially insulated from moisture or other contaminants that may be associated with the work/processing being carried out on the work products 104. A hollow drive shaft (not shown) extends down through drive shaft assembly 223. The driven pulley 222 is attached to the lower end of the hollow drive shaft and a drive pulley 262 is attached to the upper end of the hollow drive shaft. The drive pulley 262 is connected by belt 264 to an output drive pulley (not visible) powered by servo motor 260. It will be appreciated that by the foregoing construction, the servo motor 260 is located remotely from the carriage 172, with the driving force applied to the carriage 172 by the lightweight timing belt 220.

By the foregoing construction, motive system 174 is capable of quickly accelerating and decelerating carriage 172 for movement along support structure 190. Although ideally motive system 174 utilizes a servo motor, other types of electrical, hydraulic, or air motors may be employed without departing from the spirit or scope of the present invention. Such motors are standard articles of commerce.

Next, referring specifically to FIGS. 2-6 and 8, the longitudinal support structure or beam 178 cantilevers transversely from carriage 172 to be carried by the carriage. The beam 178 is composed of a vertical sidewall 290 which is substantially perpendicular to the adjacent face of carriage bed 206. The opposite sidewall 292, rather than being substantially perpendicular to the carriage bed 206, tapers towards sidewall 290 in the direction away from the carriage bed. Likewise, the top and bottom walls 294 and 296 of beam 178 taper towards the free end of the beam, thereby to cooperatively form a generally tapered shape. As will be appreciated, this enhances the structural integrity of the beam while reducing its weight relative to a parallel-piped structure.

Figure 6:
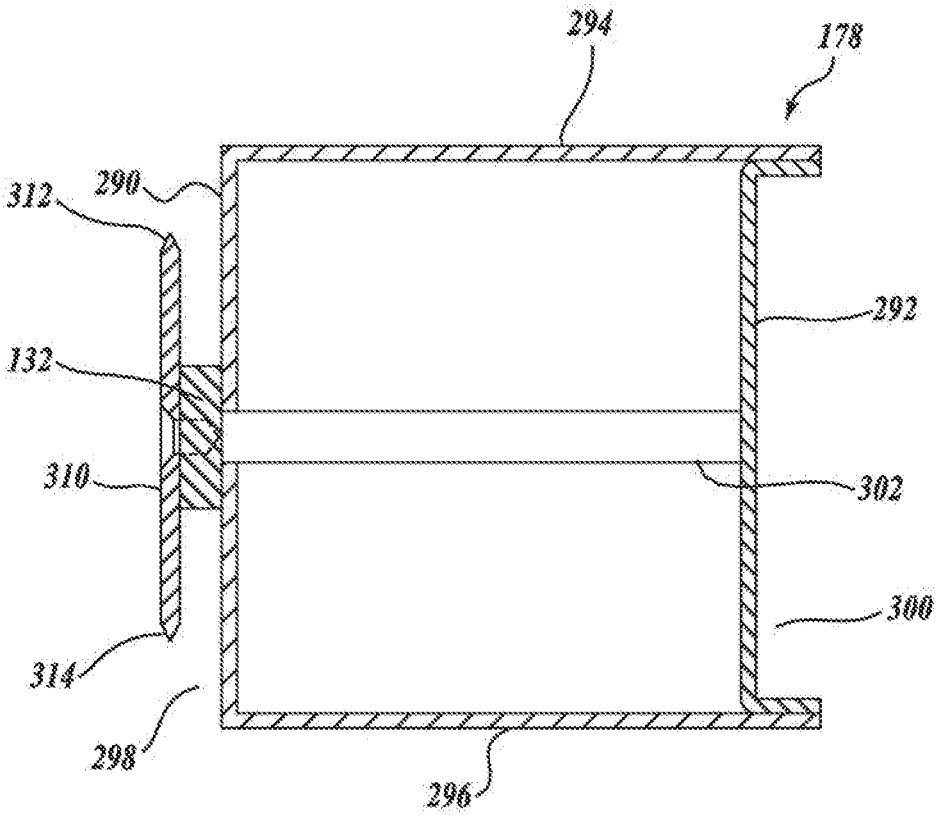
FIG. 6 is a cross-sectional view of FIG. 3.

As illustrated in FIG. 6, in one form the beam 178 may be of hollow construction, composed of two channel-shaped members 298 and 300. Channel member 300 is shallower than channel member 298 and nests within channel-shaped member 298 so that the flanges of channel member 300 overlap the free end edges of the flanges of channel-shaped member 298, as shown in FIG. 6. A plurality of spacers 302 are disposed within the beam member 178 and located along its length to bear against the sidewalls 290 and 292 of the channel members 298 and 300. The flanges of the two channel members are attached together and the spacers 302 are attached to the channel members by any convenient means, including by weldments. It will be appreciated that by the foregoing construction, beam 178 is not only lightweight, but also of sufficient structural integrity to carry significant weight without deflection. Lastly, beam 178 may be secured to the carriage bed 206 by any appropriate technique, including by hardware fasteners, weldments, etc.

Figure 3:
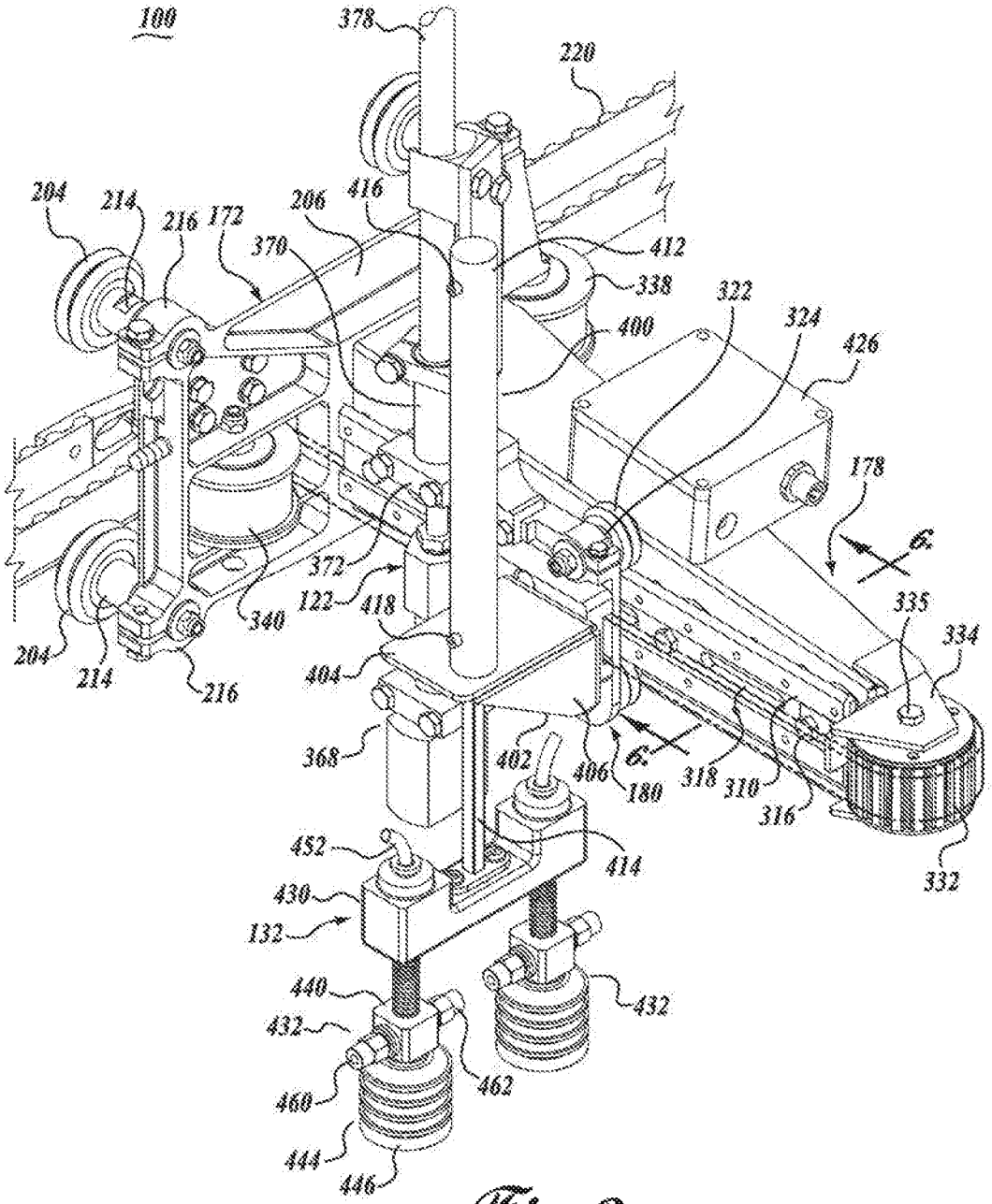
FIG. 3 is an enlarged fragmentary view of FIG. 2.
Figure 4:
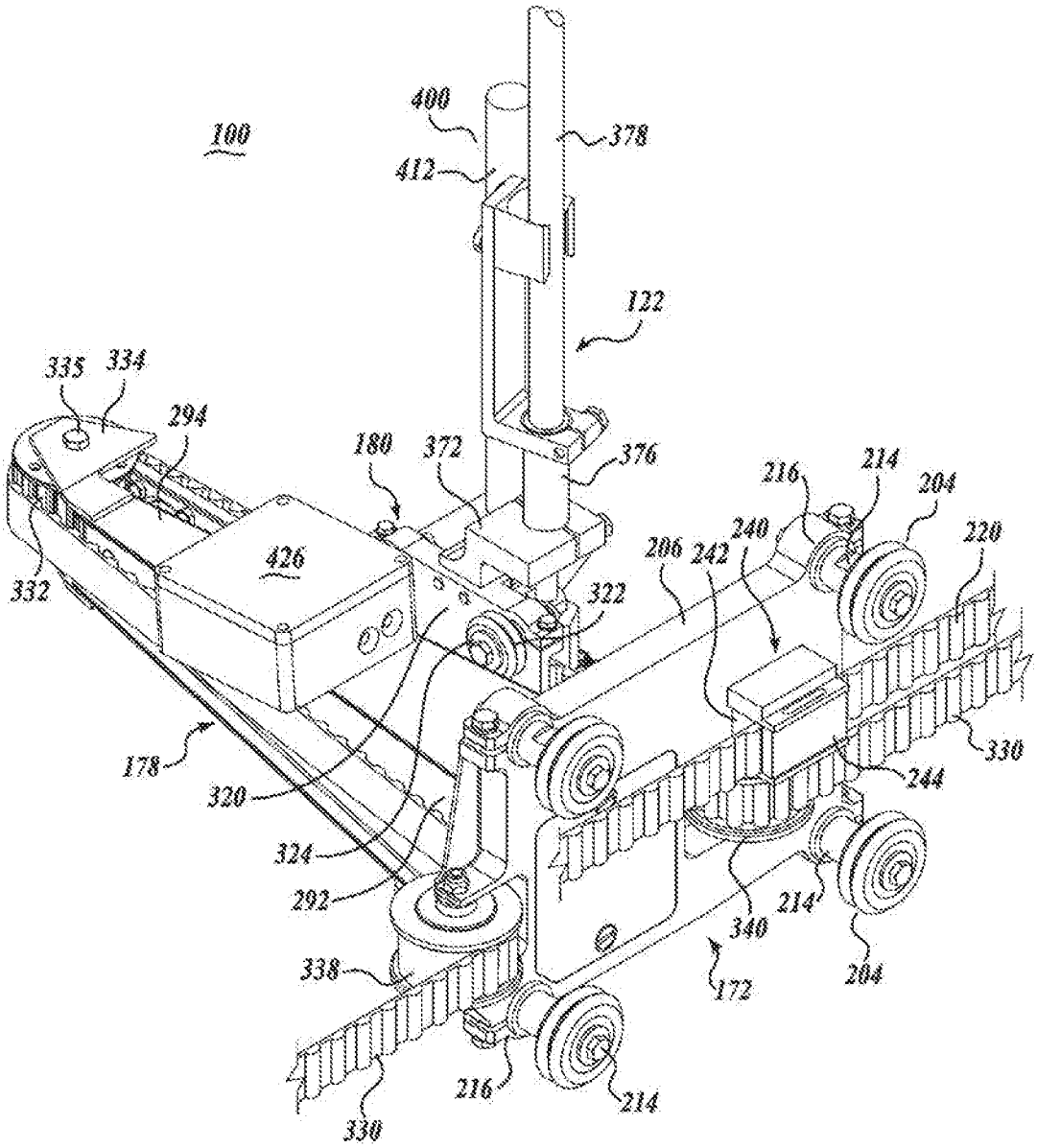
FIG. 4 is an enlarged fragmentary view taken from the back side of FIG. 3.

Referring to FIGS. 2 and 3, an elongate track 310 for carriage 180 is mounted on and extends longitudinally on beam sidewall 290. Track 310 includes formed upper and lower edge portions 312 and 314 that are spaced away from sidewall 290 to define upper and lower rails for guiding the longitudinal carriage 180. The track 310 is attached to beam sidewall 290 by a plurality of hardware members 316 and extend through clearance holes formed in the track and through spacers (not shown) fixedly mounted to sidewall 290 at the back side of the track to engage the beam 178. Also to minimize the weight of track 310, cut-out oval openings 318 are formed in the track.

The longitudinal carriage 180 is adapted to travel along track 310. In this regard, the carriage 180 includes a substantially planar, rectangularly shaped bed portion 320 and a pair of upper rollers 322 and a pair of comparable lower rollers (not shown) having concave outer perimeter portions sized to closely engage with the correspondingly crowned track upper and lower rail edge portions 312 and 314. The upper and lower rollers 322 are mounted on stub shafts 324 extending transversely from the carriage bed 320. Ideally, but not shown, anti-friction bearings are utilized between the stub shafts 324 and the rollers to enhance the free movement of the carriage 180 along track 310.

Carriage 180 is moved back and forth along track 310 by the motive system 174 that powers a timing belt 330. To this end, an idler pulley 322 is mounted on the free end of support beam structure 178 by a formed bracket 334 which is fixedly attached to the beam structure 178. A pivot shaft 335 extends through the center of an antifriction bearing mounted within pulley 322, with the ends of the shaft retained by the upper and lower ears of bracket 334.

The ends of belt 330 are attached to the bed 320 of carriage 180. This attachment can be carried out in a number of ways, including the use of a system that is similar to that described above regarding the attachment of belt 220 to carriage 172 described above. Also, the belt 330 extends partially around directional pulleys 338 and 340, anti-frictionally mounted on carriage bed 206 to direct the belt along support structure 190 and along longitudinal support structure 178.

Rotation of a drive pulley 350 angled downwardly from drive shaft assembly 223 results in movement of the belt 330 which in turn causes the carriage 180 to move along track 310. In this regard, the motive system 174 includes a servo motor 360 which is drivingly connected with drive pulley 350 by a drive shaft 362 that extends downwardly through drive shaft assembly 223. A driven pulley 364 is attached to the upper end of drive shaft 362, which pulley is connected via timing belt 366 to a drive pulley (not visible) powered by motor 360. The drive shaft 362 is disposed within the hollow drive shaft extending between pulleys 222 and 262.

As with motor 260, other types of well-known and commercially available rotational actuators may be utilized in place of servo motor 360. Also, as noted above, motive system 170 is located remotely from not only transverse carriage 172, but also longitudinal carriage 180. As a result, the mass of the motive system 174 is not carried by either of the two carriages; rather the motive system is positioned at a stationary location, with the drive force being transferred from motive system 174 to carriage 180 by a lightweight timing belt 330. As a consequence, the total mass of the moving portions of carrier system 124 (carriage 172, support beam 178 and carriage 180) is kept to a minimum. This allows extremely high speed movement of the two carriages, with accelerations exceeding eight gravities.

Cutting System

A work tool in the form of a cutter apparatus 122 depicted as in the form of a high pressure liquid nozzle assembly 368 is mounted on the longitudinal carriage 180 to move therewith. The nozzle assembly emits a very focused stream of high pressure water disposed in a downward cutting line that is nominally transverse to the plane of conveyor belt 160. The nozzle assembly 368 includes a body portion 370 that is secured to the carriage bed 320 by a pair of vertically spaced apart brackets 372 and 374. The nozzle assembly includes a lower outlet directed downwardly toward conveyor belt 160. A fitting 376 is attached to the upper end of nozzle body 370 for connecting the nozzle body 370 to a high pressure fluid inlet line 378. High pressure liquid nozzles of the type embodied by work tool 122 are well-known articles of commerce.

Unloading System

Referring specifically to FIGS. 2, 3, and 5, an unloading apparatus 132 is also illustrated as mounted on the longitudinal carriage 180 along the side of cutter apparatus 122 thereby to move with the carriage. However, the unloading apparatus may be mounted on a different carriage or even on a different type of actuator/carriage, but operably also associated with carriage 180 and/or cutter apparatus 122.

The unloading apparatus includes a linear actuator 400 mounted on a bracket 402 which in turn is mountable on carriage bed 320. The bracket 402 is illustrated as having top plate 404 and generally triangularly shaped side gusset plates 406 extending between the underside of top plate 404 and face plate 408 for attaching the bracket 402 to the carriage bed 320. The linear actuator 400 is illustrated as having an upper cylinder portion 412 and piston rod 414 extendable downwardly from the cylinder 412. The piston rod can be a square or other non-circular cross-section so as to prevent the piston rod from rotating about its longitudinal axis relative to the cylinder 412. Of course, other means can be provided for preventing the piston rod from rotating relative to the cylinder. Also, the linear actuator 400 is illustrated as being of a double-acting type so that both the extension of the piston rod 414 and the retraction of the piston rod is activated by a fluid medium introduced into the cylinder through extension fitting 416 located on the upper portion of the cylinder 412 and the retraction fitting 418 located in the lower portion of the cylinder. Fittings 416 and 418 are articles of commerce. The linear actuator 400 may be operated with pressurized fluid, for example, air or other type of gas or hydraulic fluid delivered to and expelled from the linear actuator 400 via fittings 416 and 418.

It will be noted that the linear actuator 400 will require fast motion and very short cycle times in order to handle the offloading of portioned pieces P from work products 104 in a timely manner. To this end, preferably the valve or other control system utilized to operate the extension and retraction of piston rod 414 is located close by, for example, in housing 426 positioned on the top wall 294 of the support structure 178. By positioning the valve or other control system within the housing 426, relatively short fluid lines can be used between the housing and fittings 416 and 418 of the linear actuator 400. As an alternative, the valving required for linear actuator 400 may be built into the linear actuator. The valve suitable for incorporating into the structure of a linear actuator is articles of commerce.

A yoke 430 for mounting a pair of suction pickup units 432 is attached to the bottom end of piston rod 414 by appropriate hardware members for engaging with the threaded lower end portion of a rod. The free end of rod as shown is attached to the central portion of the yoke 430 by a bracket 434 and hardware members 436.

Each of the pickup units is illustrated as having suction tip or head 440 attached to a lower end of a tube shaft 442 that slidably engages through an upright bore formed in the enlarged end portions of the yoke 430. A compressible bellows cup assembly 444 is attached to the suction tip 440 to project downwardly from the suction tip. The bottom 446 of the bellows assembly is cup-shaped so as to achieve a secure attachment with portioned workpieces to be picked up. The suction head 440 has a vertical bore 450 extending therethrough to intersect with the hollow interior of the tube shafts 442. The upper ends of the tube shafts 442 are connectable to forces of pressurized fluid via connecting tubes 452.

Suction is applied to the suction tips 440 through the use of a venturi assembly built into the suction head 440. Pressurized air is applied to a venturi assembly disposed within the suction head 440. To this end, pressurized air is applied to the venturi assembly through inlet fitting 460 via supply line connectable to the fitting 460. The venturi creates a source of reduced air pressure in a standard manner which is transmitted to the bore 450 by the venturi transversely intersecting the bore. The exhaust from the venturi is emitted from the suction head via outlet fitting 462 disposed on the opposite side of the suction head from fitting 460. Pressurized air can be directed into fitting 462 when desiring to break the suction connection between the cup assembly 444 and the portioned workpiece P. The positive pressure air source passing through the venturi via the outlet fitting 462 can also be used to "backblow" the suction head 450 to assist in cleaning out the suction head or removing matter from the workpieces that may have become lodged therein.

So as to assist in preventing matter from the workpieces 104 from clogging the venturi, a screen 470 is positioned at the intersection of the suction head 440 and the bellows cup assembly 444 in an effort to prevent the matter from the workpieces from passing into the venturi located within the suction head. The screen can be of various composition, include from wire mesh, plastic mesh, expanded metal, porous ceramic, or sintered metal filters, for example. The backblow described above produced by pressurized air introduced into the suction head 440 via fitting 462 may not be sufficient from keeping the screen 470 from becoming clogged. The present disclosure provides a means for seeking to removing matter or debris from the screen 470. To this end, pressurized air is directed to tube shafts 442 via inlet lines 452. Such pressurized air is directed at the screen 470 in the direction opposite to the suction stream created by the venturi located within the suction head 440. The speed of the compressed air or other fluid flowing through the tube shafts 442 can be increased by utilizing a converging/diverging nozzle so that the fluid velocity can achieve even supersonic speeds in the localized area near the center of the screen 470, thereby clearing away any debris or matter that may have become lodged on the screen.

Figure 7:
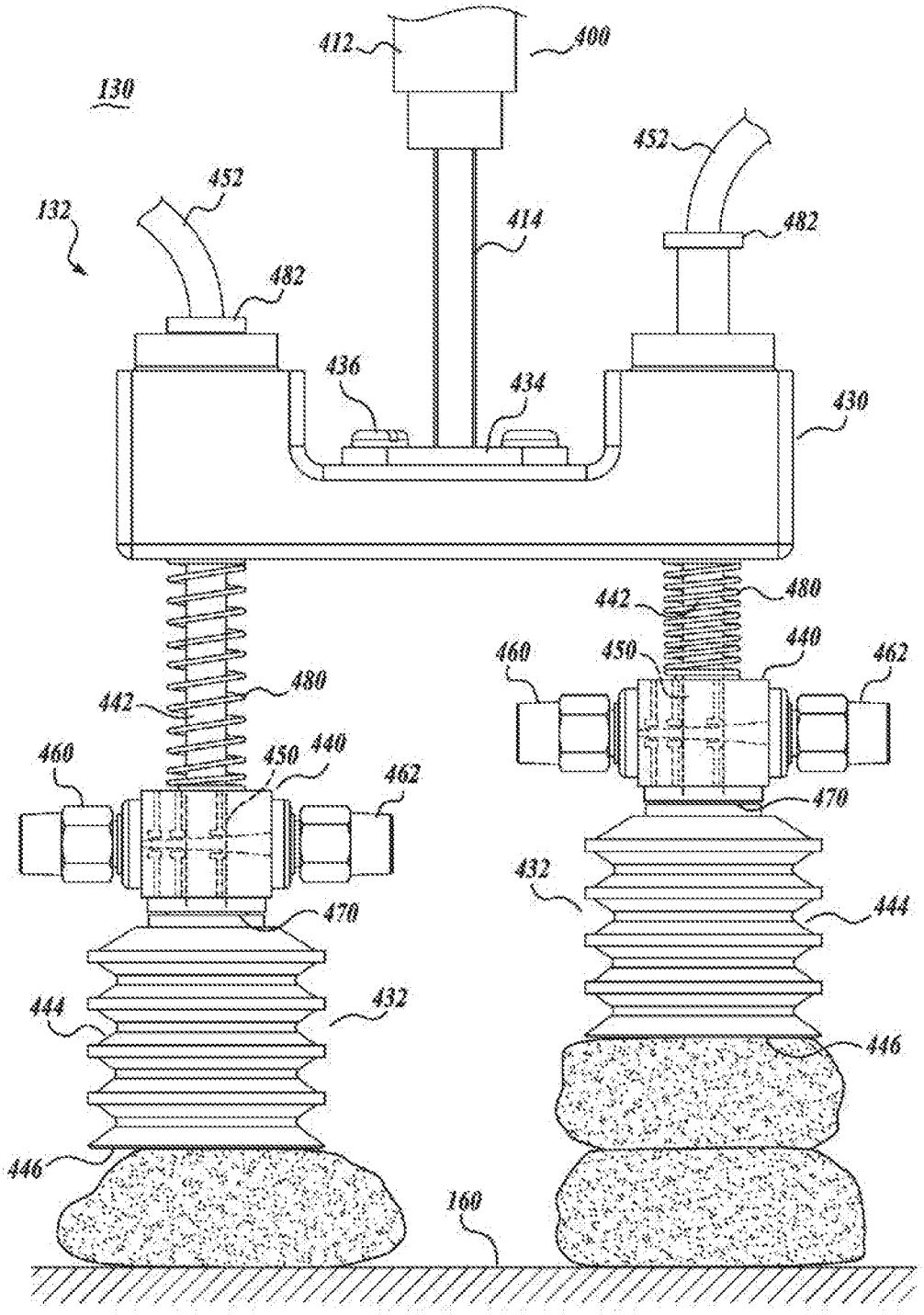
FIG. 7 is an enlarged elevational view of a portion of FIG. 2 directed at a portion of an unloading system taken in the direction of 7-7.
Figure 8:
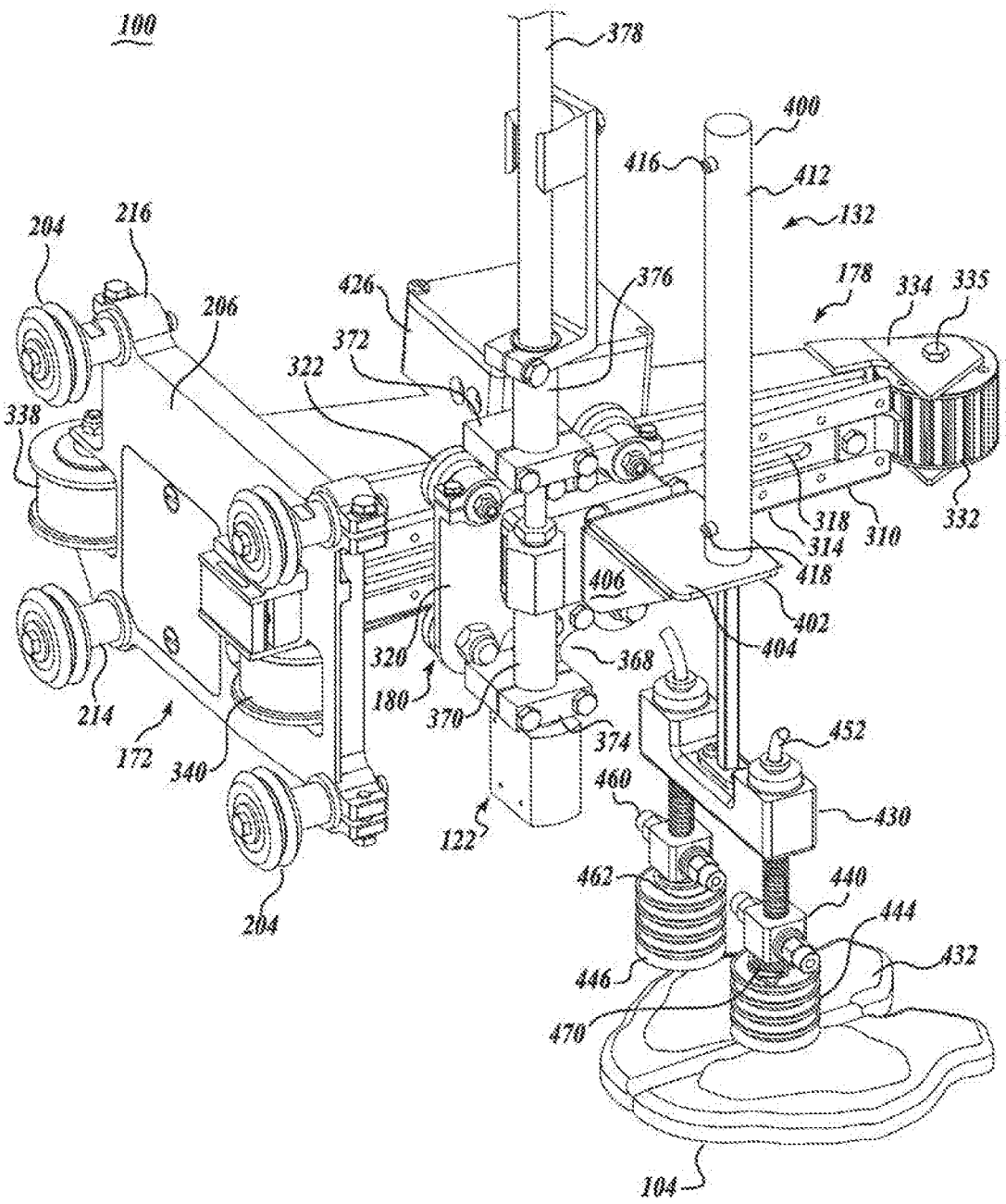
FIG. 8 is a perspective view similar to FIG. 3 but rotated in a counter-clockwise direction relative to FIG. 3.

Referring specifically to FIG. 7, a compression spring 480 is disposed over tube shaft 442 between the upper side of the suction head 440 and the under side of yoke 430. The compression spring nominally will cause the slide tube 442 to be positioned in a downward, extended position relative to the yoke 430. When the slide tube is in a fully downward position, a retaining nut or head 482 bottoms against the upper side of yoke 430. The retaining spring 480 allows the tube shaft 442 to slide or retract upwardly relative to the yoke 430, for instance, when the cup assembly 444 makes contact with the upper side of a workpiece portion P. FIG. 7 illustrates the situation wherein when one bellows cup assembly 444 is lowered to pick up a workpiece portion P, the second bellows assembly 444 may have already picked up a workpiece portion P and then when the yoke 430 is lowered, the workpiece portion P attached to the second bellows cup assembly 444 may stack on top of another workpiece portion P. If this situation occurs, the associated spring 480 compresses as the tube shaft 442 slides upwardly through a close fitting bore formed in the yoke 430. As a consequence, the maximum force that is applied to workpieces and workpiece portions by the pickup units 432 is limited to a controlled level. It can be appreciated that this allows for very fast motion of the pickup units 432 to extend downwardly and pick up work products and portions thereof without damaging the work products or portions, or damaging the pickup units 432. Also, it will be appreciated that by utilizing a tapered compression spring, the spring can collapse down to roughly one wire diameter for maximum retraction of slide tube 442.

FIGS. 2, 3, 7 and 8 illustrate two pickup devices mounted on yoke 430. The pickup devices can be spaced apart from each other based on the types of work products being processed. For instance, if a chicken breast butterfly is being cut into two halves, a spacing between the two pickup units 432 may be such that the bellows cup assemblies 444 are able to each pick up one of the portioned chicken breast halves at the same time. However, if the spacing between the bellows cup assembly 444 does not match that required for the work product being processed, then the pickup devices can be actuated one at a time. A first chicken breast half can be picked up and then the yoke 430 moved slightly to pick up the second chicken breast half. Nonetheless, significant time is saved because the distance that the bellows cup assembly 442 needs to be moved to pick up the second chicken breast half is minimized.

Rather than utilizing two pickup units 432, a larger number of pickup units, for example, four pickup units may be utilized. Further, the spacing among the four pickup units 432 may be designed based on the work product being processed. For example, if chicken nuggets are being cut, the pickup units 432 may be positioned relative to each other so as to efficiently pick up the chicken nuggets from the conveyance system for removal therefrom.

Referring specifically to FIG. 1, the portions cut from work products 104 when lifted off the conveyor belt 160 by unloading apparatus 132 may be placed on a takeaway conveyor 140 extending along the side of conveyance system 102. From conveyor 140, the portion pieces P may proceed for further processing. Alternatively, the portioned pieces may be placed within chutes 142 shown in FIG. 1 as disposed along the opposite side of the conveyor belt 160 from the location of the takeaway conveyor 140. Rather than using a single side conveyor 140, side conveyors similar to conveyor 140 can be vertically stacked or side conveyors can be positioned on both sides of the main conveyance system 102 so that different portion pieces P are placed on different conveyors based on various criteria, such as the size, thickness, weight of the portioned pieces, or other characteristics. Also, the different conveyors can transmit the portioned pieces for different types of subsequent processing. The unloading system 130 may place the portioned workpieces P into the chutes 142 from which the portioned pieces P may drop down into a conveyor or bin (not shown) for further processing.

Figure 9:
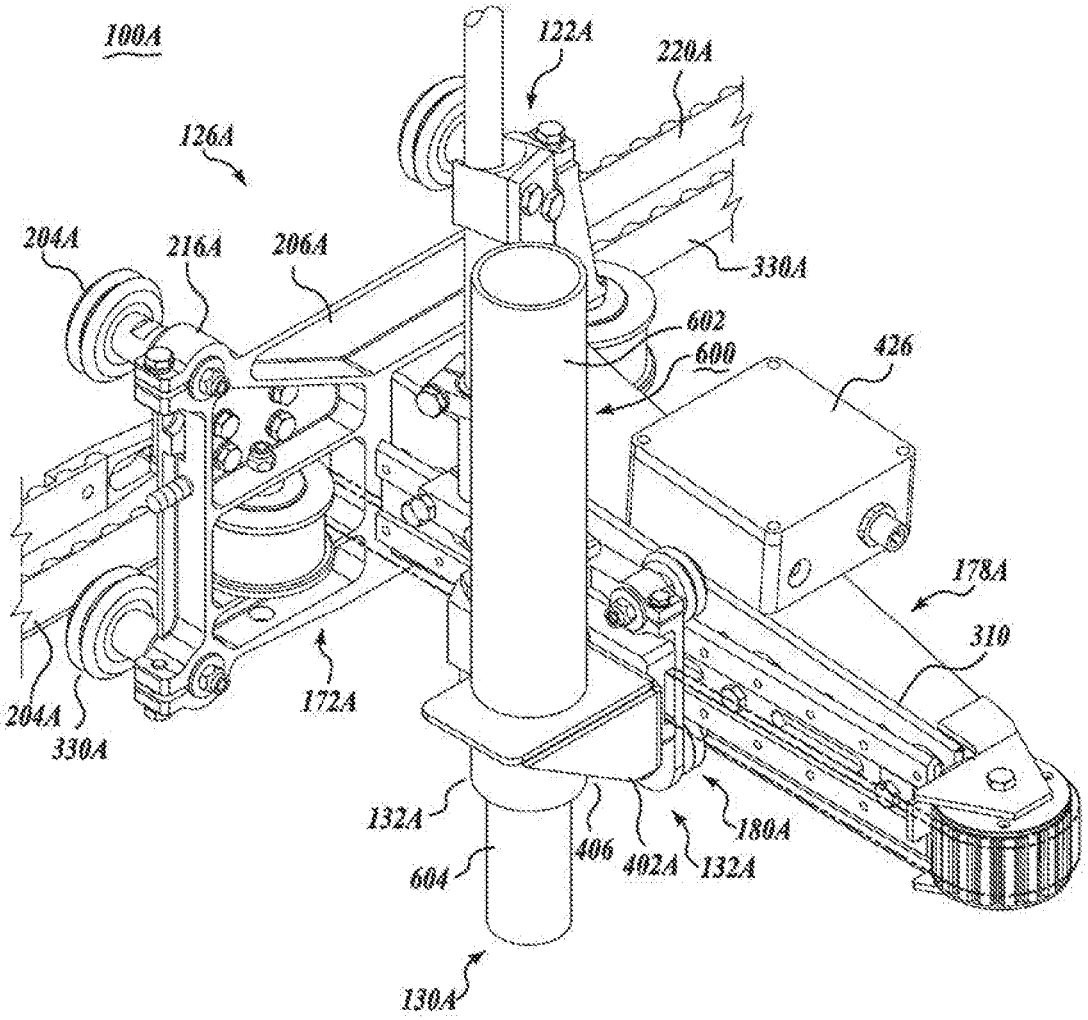
FIG. 9 is a further embodiment of the present disclosure.

A further embodiment to the present disclosure is illustrated in FIG. 9, wherein the conveyance system 100A is illustrated as of similar construction with conveyance system 100, but with the different unloading system 130A. The components of system 100A that are similar to system 100 are identified with the same part numbers. The description of these parts are set forth above, and thus will not be repeated here.

As noted above, the main difference between system 100 and system 100A is that in system 100A, unloading system 130A replaces unloading system 130. Unloading system 130A includes a relatively large diameter suction system 600 for lifting portioned workpieces upwardly from the conveyor belt 160 for transport to other locations for further processing of the portioned workpieces. To this end, suction system 600 includes a suction tube 602 connectable to the upper end portion of a suction nozzle 604 that is attached to carriage 180 by a mounting bracket 402A. The nozzle 604 is telescoping so as to be downwardly extendable and upwardly retractable relative to conveyor belt 160. The vacuum for unloading system 130A can be generated by relatively small local vacuum generators, not shown, in vacuum flow communication with suction tube 602.

It will be appreciated that the carrier system 124 is capable of moving the suction nozzle 604 over the portion to be removed from the conveyor belt. Alternatively, rather than using unloading system 130A for removal of portions, the system can instead be used to remove the work product trim from the conveyor belt instead. Moreover, when the portioned pieces are in the form of relatively small units, such as chicken nuggets, often it is difficult to remove the nuggets from the conveyor belt at any rate of speed. The use of the unloading system 130A can be quite helpful in this regard. Once the portioned product, nuggets, trim, etc., are removed from the belt and lifted into suction tube 602, a conventional vacuum conveyance system can be utilized for the unloading of the portions/nuggets/trim and further processing thereof.

Figure 10:
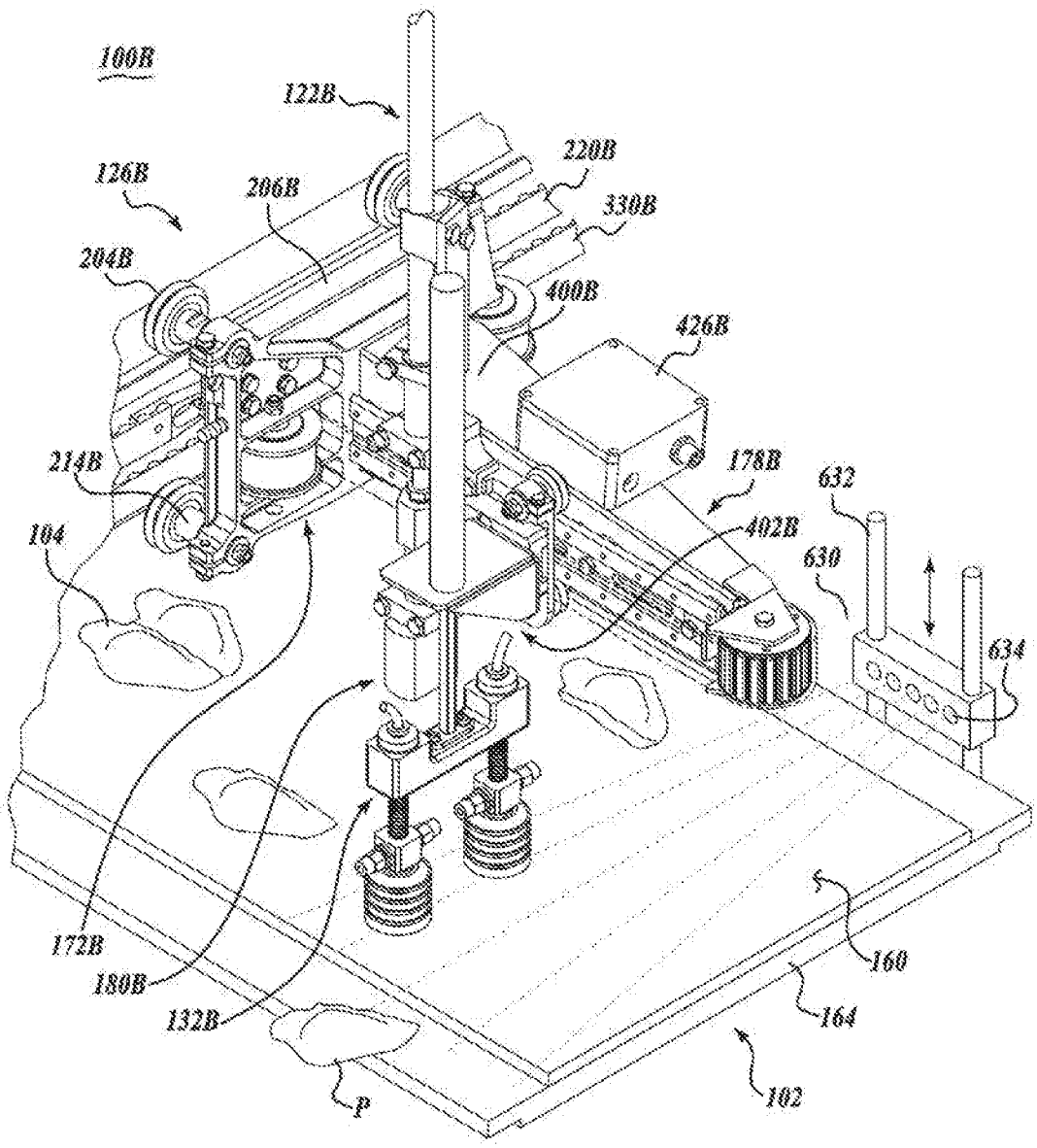
FIG. 10 is a further embodiment of the present disclosure.

FIG. 10 illustrates a trim sweep system for removing the trim from the conveyor belt 160 after the portions have been lifted off the belt by the unloading system 130. As shown in FIG. 10, the trim sweep system illustrated consists of a nozzle manifold 630 located along the side of conveyor belt 60. The manifold 630 is mounted to be able to raise and lower on lifting guides 632. Also, although not shown, the nozzle manifold 630 can be adapted to tilt so as to aim the air streams emitted from the manifold at a desired direction, typically downward toward the surface of the conveyor belt 160. A series of outlet nozzles 634 are spaced along the length of the nozzle manifold 630 to emit an air stream from each of the nozzles. The air stream pattern from the nozzles 634 and the air velocity of such air streams can be selected to blow the workpiece trim off of the conveyor belt 160 and into a trough, chute, side conveyor, collection bin, etc., on the opposite side of the conveyor belt. It is to be appreciated that the nozzle manifold 630 can be placed appropriately along the length of the conveyance system 102 so that once the trim has been removed from the conveyor belt 160, the portioned pieces lifted off the conveyor by the pickup units 432 can be replaced back on to the conveyor belt at the same location or close to the same location on the belt that the portions were removed from the belt initially.

It will be understood that rather than blowing the trim completely off of the belt 160, the trim could instead be blown to another location on the belt, for instance, to form a windrow along the belt. In this situation, the trim would be removed from the portions so that the portions can be replaced onto the belt, in the same location as lifted off the belt, as noted above, or in a different arrangement. In this regard, the trim could be swept to the middle of the belt, thereby retaining the outside sections of the belt for the larger portions. Also, it may be that part of the trim is cut into nuggets, and then such nuggets are swept to a desired location across the belt or even off the belt by the air sweeping system. Other possibilities in this regard are within a scope of the present disclosure.

As noted above, the nozzle manifold 630 is illustrated as mounted alongside the conveyor belt 160. The nozzle manifold or other type of air sweep system can instead be mounted on the unloading apparatus 132 to perform the same functions described above carried out by the nozzle manifold 630. Pressurized air, as noted above, is supplied to the unloading system 130, and thus such pressurized air can also be used for the sweep system.

Figure 11:
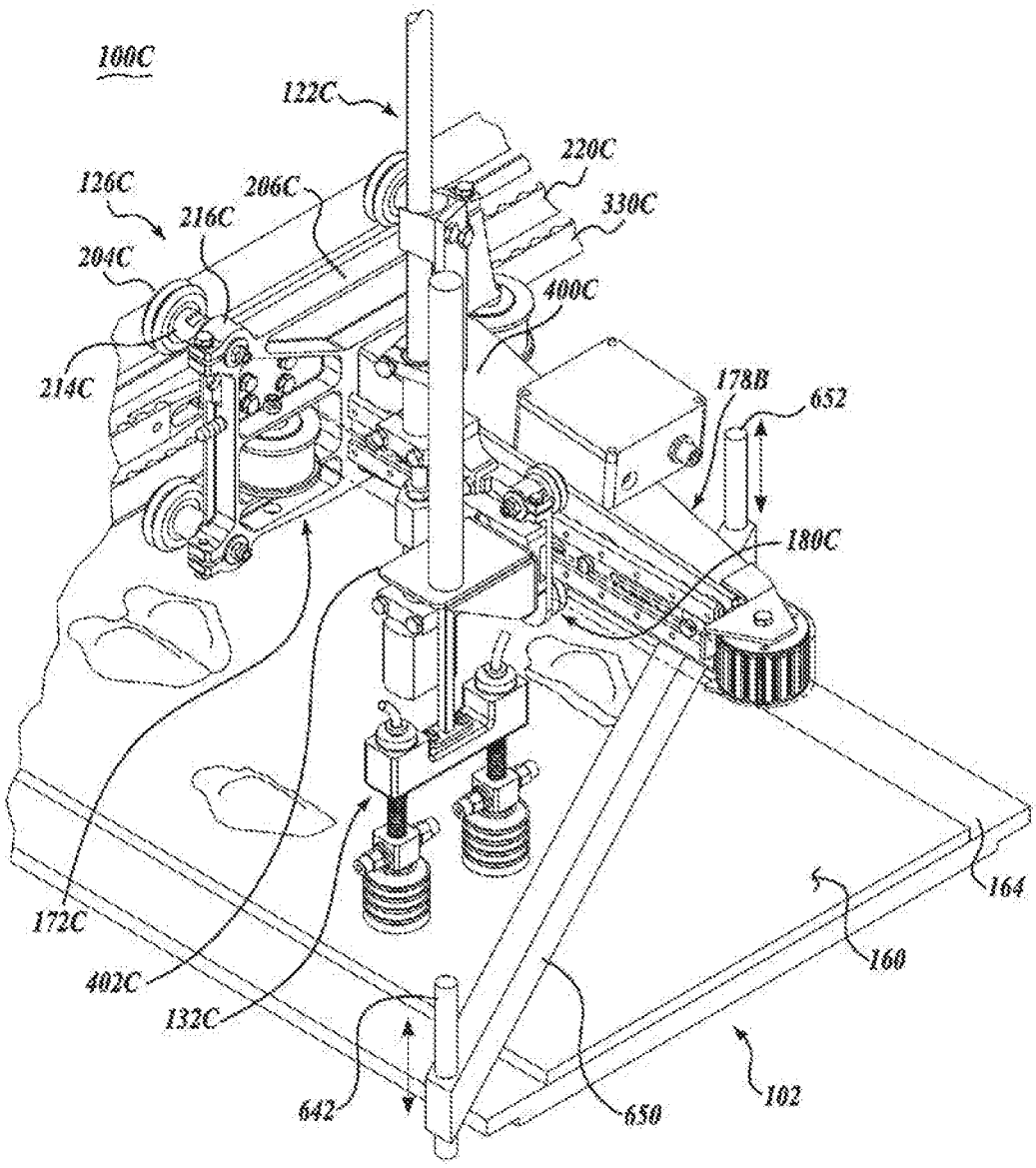
FIG. 11 is a further embodiment of the present disclosure.

Referring to FIG. 11, a further disclosure of a trim/nugget sweep system is illustrated as composed of a blade 650 extending diagonally across the conveyor system 102. The blade 650 is mounted for raising and lowering by lifting guides 652 disposed alongside conveyor belt 160. The blade 650 is designed to cause the trim and/or nuggets remaining from the portioning process to be moved laterally relative to the belt 160 and off a side edge of the belt into one or more side conveyors, chutes, troughs, containers, etc. As noted above, with respect to nozzle manifold 630, the blade 650 can be located relative to the carrier systems 124 to enable the portioned pieces lifted off the belt by the pickup units 432 to be replaced back onto the belt at a location that is the same or corresponding to the location removed from the belt. It will be appreciated that the blade 650 can be lowered into operational position or raised into a retracted position relative to the conveyor belt 160 as desired. Also, rather than being static (other than moving up and down), the plate 450 can be mounted on an actuator to move across the belt 160 to actively push trim and/or nuggets off of the belt 160.

It will be understood that, rather than using the blade 650 that spans across the entire width of the belt, instead one or more blades of other shapes can be utilized so as to move the desired work products either to a desired location on the belt or off the belt. For example, such blades can move the trim and/or nuggets to a specific location laterally of the belt or off the edge of the belt. For example, it may be desirable to sweep the trim and/or nuggets toward the middle of the belt, thereby retaining the side sections of the belt for the cut portions.

Also, rather than mounting the blade 650 or other type of blade utilized for the sweeping system on the conveyer frame or other stationary structure, such blade can instead be mounted on the unloading system 130. In this regard, the blade can be mounted on the pickup units 432 or mounted elsewhere relative to carriage 172.

Figure 12:
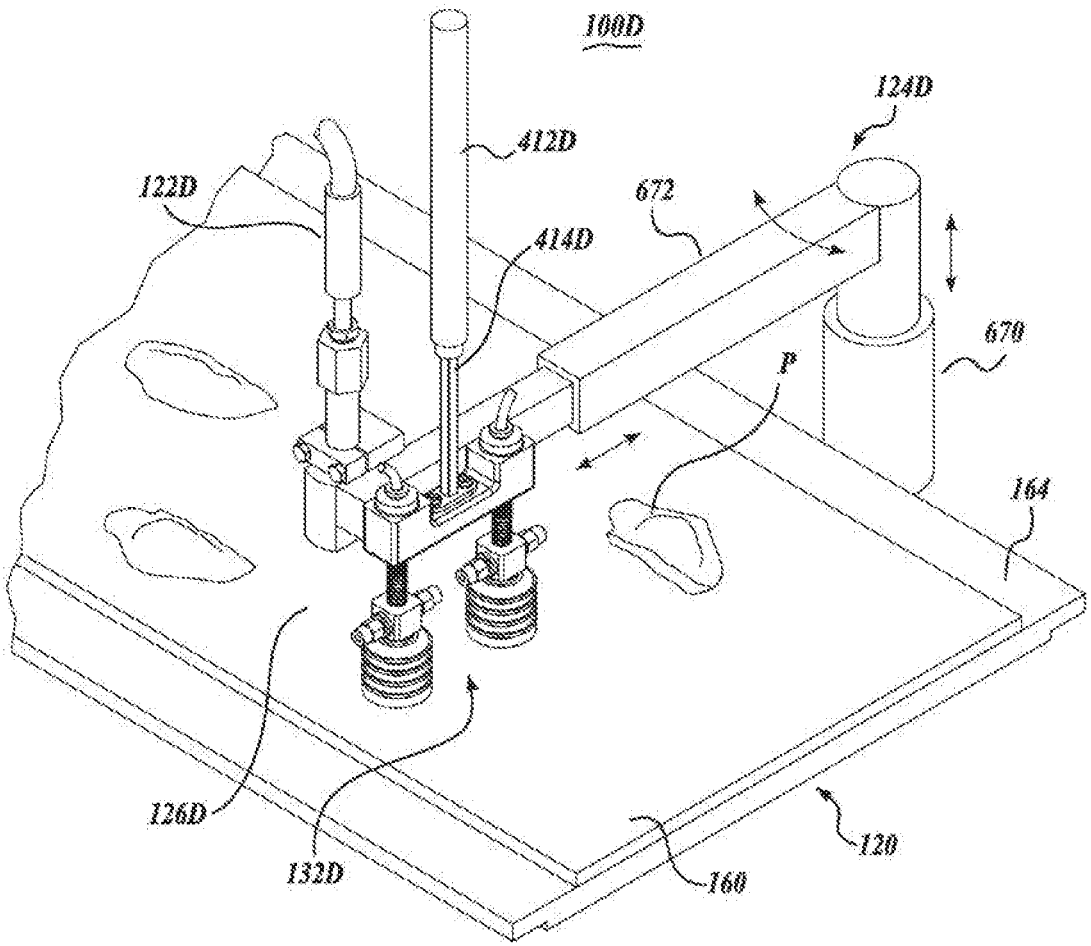
FIG. 12 is a further embodiment of the present disclosure.

A further aspect to the present disclosure is illustrated in FIG. 12, wherein system 100D is illustrated as composed of carrier system 124D in the form of a rotatable, elevatable, and extendable carrier apparatus 126D. As shown in FIG. 12, the carrier apparatus 126D includes a rotatable and elevatable post assembly 670 mounted along the side conveyance system 102. The post assembly is powered to raise and lower relative to the surface of the conveyor belt 160 and also to rotate a telescoping beam 672 over the conveyor belt 160. The beam 672 is powered to extend and retract along its length so as to position a cutter assembly 122D and unloading assembly 132D at desired locations over the surface of the conveyor belt 60. The cutter assembly 122D is mounted to one side of the free end of the beam 672 and the unloading assembly 132D is mounted to the opposite side of the free end of the beam. It will be appreciated that the cutter assembly 122D and unloading assembly 132D are structurally and operationally similar or identical to the corresponding cutter assembly 122 and unloading assembly 132 described above. In this regard, the unloading assembly 132D may include a cylinder 412D with corresponding piston rod 414D in the manner of the unloading assembly 132. Or, alternatively, the unloading assembly 132D may rely on the ability of the post assembly 670 to raise and lower relative to the conveyor belt 160. It will be appreciated that the system 100D shown in FIG. 12 can provide the same operational functions and advantages as provided by systems 100-100C described above.

Figure 13:
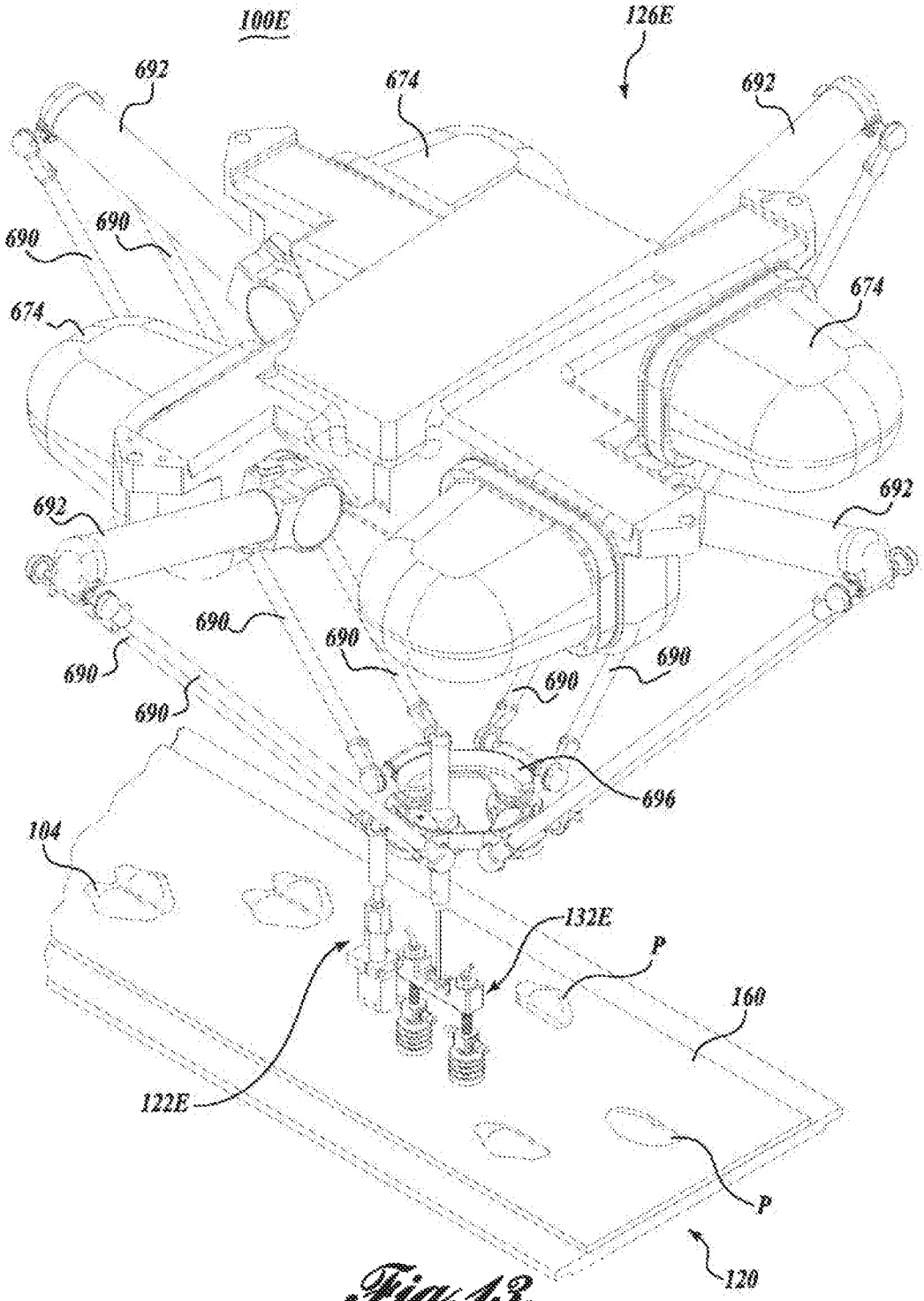
FIG. 13 is a further embodiment of the present disclosure.
Figure 14:
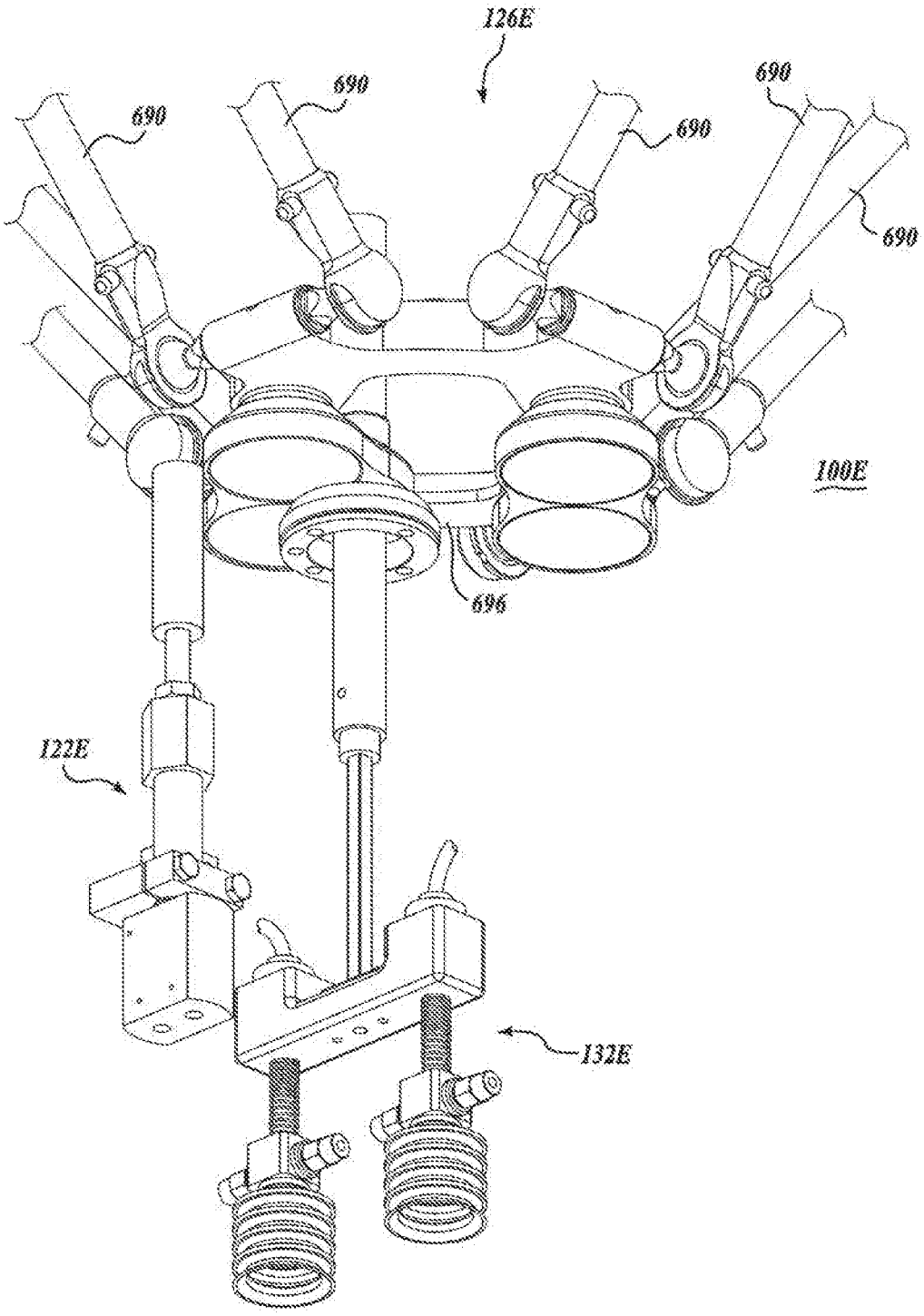
FIG. 14 is a fragmentary pictorial view of a portion of FIG. 13.

Next, referring to FIGS. 13 and 14, a further embodiment of the present disclosure includes a system 100E for both portioning work products 104 and unloading the cut portions from conveyance system 102. As shown in FIGS. 13 and 14, system 100E is composed of a carrier system 124E in the form of a robotic structure 126E. The structure 126E is composed of four sets of powered arm pairs 690 that are connected to each other at one end (upper end) to a powered pivot arm 692, which in turn is connected to a rotary actuator 694 that is powered to rotate about a horizontal axis. Each of the four pivot arms 692 extend outwardly from a central axis in a quadrant arrangement. The lower or opposite ends of the arm pairs 690 are connected to a carrier head or ring 696 to which a cutter assembly 122E and an unloading assembly 132E are mounted.

The carrier system 124E is capable of moving the carrier head 696, and thus the cutter assembly 122E and unloading assembly 132E in any direction over the conveyor 160, including side to side, longitudinally, up and down, as well as diagonally. The carrier system 124E is also capable of tiling the cutter assembly 122E and unloading assembly 132E away from vertical into a desired orientation. As such, the cutter assembly 122E is capable of cutting the work products 140 in a desired manner, and the unloading assembly 132E is able to grasp the portioned work products P in a desired manner. Although a singular carrier system 124E is shown in FIGS. 13 and 14, multiple carrier systems can be utilized, as in systems 100, 100A, 100B, 100C, and 100D noted above. Also, as in the systems 100, 100A, 100B, 100C, and 100D noted above, sweeping systems for moving or sweeping the trim and/or nuggets and/or portioned pieces may be utilized in conjunction with the carrier system 124E.

While illustrative embodiments have been illustrated and described, it will be appreciated that various changes can be made therein without departing from the spirit and scope of the invention.

For example, while various carrier systems 124, 124B, and 124C have been described above, other carrier systems may be utilized. For example, a carrier system may be composed of other types of robotic apparatus described above.

As another example, although the pickup units 432 have been described as utilizing suction action to grasp the portioned workpieces; other types of methods can be employed in this regard. For example, if the workpiece is composed of magnetically conductive material, the pickup device may utilize a magnet. Alternatively, the pickup device may consist of a clamp, jaw, or fingers structure capable of physically grasping the workpiece for lifting off of the conveyance system 102 and then releasing the workpiece portions at one or more desired remote locations. As a further alternative, the pickup device may include forks or tines in place of the suction head 440 to spear the workpiece portions. As another alternative, the pickup device may consist of very cold (below freezing temperature) heads that "stick" to the workpiece thereby to pick up the workpiece from the conveyance system.

In addition, the carriage 180 can be configured so that the rather mounting a cutter assembly 122 and an unloading assembly 132, two or more cutter assemblies, or two or more unloading assemblies can be mounted on the carriage. This may be carried out, for example, by forming the applicable hole patterns on the carriage bed 320 for the hardware members used to mount the cutter assemblies and also unloading assemblies to the carriage bed.

It will be appreciated that, by the foregoing construction, the same type of carrier system may be used to carry both cutter assemblies 122 and unloading assemblies 132, thereby resulting in commonality of components of the system 100. This enables the carrier apparatus 126 to be used to carry either cutter assemblies, unloading assemblies, or both. Further, this result in efficiency of spare parts required for the carrier assemblies 126.

The invention claimed is:

1. A system for cutting portions from a workpiece based on desired physical specifications of the cut portions resulting in one or more cut portions and remaining trim, and then unloading the cut portions to separate the cut portions from any remaining workpiece trim, comprising:

(a) a conveyance system for conveying the workpiece;

(b) a scanning system for scanning the workpiece and generating data pertaining to physical specifications of the workpiece and to the location of the workpiece on the conveyance system;

(c) a cutting system for cutting one or more portions from the workpiece;

(d) at least one carrier system for supporting and moving the cutting system laterally and longitudinally of the conveyance system along cutting paths to cut the workpiece into portions per desired physical specifications;

(e) at least one powered unloading system operatively associated with the at least one carrier system, said unloading system operable to [grasp the cut portions,] lift the cut portions off the conveyance system to remove the cut portions from the conveyance system, and deposit the cut portions at desired locations; and (f) a control system processor operable to:

(i) process the scanning data and the desired physical specifications of the portions to determine the cutting paths required to cut the workpiece to achieve the desired physical specifications for the portions;

(ii) direct the cutting system to perform the required cuts; and (iii) direct the at least one powered unloading system to pick up the cut portions from locations on the conveyance system as determined by the scanning data and [and] deposit the cut portions at desired locations.

2. The system according to claim 1, wherein the at least one carrier system comprises an X-Y gantry system disposed over the conveyance system.

3. The system according to claim 2, wherein said X-Y gantry system comprises a powered carriage on which the cutting system is mounted for moving relative to the conveyance system.

4. The system according to claim 3, wherein the at least one powered unloading system is mounted on the same carriage on which the cutting system is mounted.

[5. The system according to claim 2, wherein the at least one powered unloading system is supported and moved by the X-Y gantry system.]

6. The system according to claim 1, wherein the cutting system is carried by a rotatable and extendable actuator located alongside the conveyance system.

7. The system according to claim 6, wherein the at least one powered unloading system is operatively associated with the actuator used to carry the cutting system.

[8. The system according to claim 7, wherein the at least one powered unloading system is carried by the same type of actuator used to carry the cutting system.]

[9. The system according to claim 8, wherein the at least one powered unloading system is carried by the same type of actuator used to carry the cutting systems.]

10. The system according to claim 1, wherein the carrier system comprises an automated, multi-directional actuator system capable of moving at least along, across, and diagonally relative to the conveyance system.

11. The system according to claim 10, wherein the multi-directional actuator system is also capable of moving upward and downward relative to the conveyance system.

12. The system according to claim 11, wherein the multi-directional actuator system comprises a plurality of sets of powered arm pairs, said arm pairs having upper ends and lower ends, the upper ends of the arm pairs are connected to a power pivot arm which in turn is connected to a powered rotor actuator, and the lower ends of the arm pairs are connected to a hub to which is mounted the cutting system.

13. The system according to claim 12, wherein the at least one powered unloading system is carried by the same hub used to carry the cutting system.

[14. The system according to claim 12, wherein the at least one powered unloading system is carried by the same type of hub used to carry the cutting system.]

[15. The system according to claim 12, wherein the at least one powered unloading system is operably associated with the actuator system used to carry the cutting system.]

16. The system according to claim 1, wherein the cutting system is selected from the group consisting of high-speed fluid jets, high-speed water jets, laser beams, knives, and saws.

17. The system according to claim 1, wherein the at least one powered unloading system comprises at least one vacuum-operated actuator for attaching to the cut portions.

18. A system for cutting portions from a workpiece based on desired portion physical specifications resulting in one or more cut portions and remaining trim, and then unloading the cut portions to separate the cut portions from the remaining workpiece trim, comprising:

(a) a conveyance system for conveying the workpiece;

(b) a scanning system for scanning the workpiece and generating data pertaining to physical attributes of the workpiece;

(c) a cutting system for cutting portions from the workpiece;

(d) a carrier system for moving the cutting system laterally and longitudinally of the conveyance system along cutting paths to cut the workpiece into desired shapes and/or sizes:

(e) an unloading system operatively associated with the carrier system used to carry the cutting system, said unloading system operable to remove the cut portions from the conveyance system;

(f) a control system processor operable to:
(i) process the scanning data and portion physical specifications to determine cutting paths required to achieve desired portion physical specifications for the workpiece;
(ii) direct the cutting system to perform the required cuts; and
(iii) direct the unloading system to pick up the cut portions from the conveyance system and deposit the cut portions in desired locations based on the known location of the cut portions as determined by scanning and cutting the workpiece; and
(g) wherein the at least one unloading system comprises at least one vacuum-operated actuator for attaching to the cut portions, the at least one vacuum-operated actuator comprising:
(i) a vacuum head for attaching to the cut portions and connectable to a vacuum stream in flow communication with the vacuum head;
(ii) a separation screen between the vacuum head and the vacuum stream; and
(iii) a source of pressurized fluid to direct pressurized fluid at the separation screen in a direction toward the vacuum head.

19. The system according to claim 18, further comprising an actuator system connected to the vacuum head to raise and lower the vacuum head.

[20. The system according to claim 19, comprising a plurality of vacuum actuators disposed in sets for unloading a plurality of cut portions from the conveyance system.]

21. The system according to claim 1, wherein the at least one powered unloading system comprises a suction head connectable in suction flow communication with a source of suction, said suction head having an inlet of a minimum width large enough to enable entry of the cut portions through the suction head for removing the cut portions from the conveyance system.

22. The system according to claim 1, wherein said at least one carrier system comprises a traveling head movable laterally and longitudinally relative to the conveyance system and adapted to carry one or both of the cutting system and the at least one powered unloading system.

23. The system according to claim 1, further comprising a plurality of carrier systems for carrying together both a cutting system and at least one powered unloading system to remove the cut portions from the conveyance system and place said removed cut portions at selected locations away from the conveyance system.

[24. The system according to claim 23, wherein said carrier systems are positioned and controlled to operate within designated areas of the conveyance system, said designated areas comprising at least two areas in a direction laterally of the direction of travel of the conveyance system.]

[25. The system according to claim 1, wherein the cutting system can be replaced with one or more unloading systems and the unloading system can be replaced with one or more cutting systems.]

26. The system according to claim 1, wherein the control system processor is operable to control the cutting system to cut the workpiece; and then control one or both the unloading system and the conveyance system to pick up the cut portions of the workpiece from the conveyance system before the cut portions travel beyond the range of the at least one carrier system on which the cutting system and powered unloading system are both mounted.

[27. The system according to claim 1, wherein the control system processor is selectively operable to:
operate the cutting system while the unloading system remains inoperative; and
operate the at least one powered unloading system while the cutting system remains inoperable.]

28. The system according to claim 1, further comprising a trim sweep system to move the trim relative to the conveyance system to one or more desired locations on the conveyance system and/or to one or more locations off of the conveyance system.

29. The system according to claim 28, wherein the trim sweep system is selected from the group consisting of: a fluid stream; an air knife; a blade mounted on the unloading system; a blade mounted on the conveyance system; and a blade mounted on a frame adjacent the conveyance system.

[30. A system for cutting portions from workpieces based on desired portion physical specifications of the cut portions resulting in one or more cut portions and remaining trim and then unloading the cut portions to separate the workpiece cut portions from any workpiece trim, comprising:
(a) a conveyance system to convey the workpieces;
(b) a scanning system for scanning the conveyed workpieces and generating data related to the physical specifications of the workpiece and to the location of the workpiece on the conveyance system;
(c) a powered cutting system for cutting the workpieces into portions of desired specifications;
(d) a carrier system for supporting and moving the cutting system laterally and longitudinally of the conveyance system, thereby to move the cutting system along desired paths relative to the workpieces to cut the workpieces into portions of desired specifications;
(e) an unloading system movable laterally and longitudinally relative to the conveyance system and vertically relative to the conveyance system to attach to the cut portions of the workpieces, lift the cut portions off the conveyance system, and move the lifted cut portions to desired locations;
(f) a trim sweep system to move or sweep the workpiece trim remaining subsequent to the cutting of portions from the workpieces to one or more desired locations on the conveyance system and/or to one or more locations removed away from the conveyance system; and
(g) a control system to:
process the scanning data and portioning specifications to determine the cut paths required to achieve the desired shapes and sizes of the cut portions; and
direct the powered cutting system to perform the required cuts of the workpieces;
control the unloading system to pick up the cut portions of the workpieces based on the known location of the cut portions on the conveyance system as determined by the scanning data and deposit the cut portions at desired locations; and
direct the workpiece trim sweeping system to remove the workpiece trim to the one or more desired locations on the conveyance system and/or the one or more desired locations remote from the conveyance system.]

[31. The system according to claim 30, wherein after the removal of the trim, the unloading system deposits the portions lifted from the conveyance system back on to the conveyance system in the same general location that the portions were removed from the conveyance system.]

[32. The system according to claim 30, wherein the trim sweep system comprises: one or more air nozzles; one or more air knives or a source of compressed air, carried by the same carrier used to carry the unloading system.]

[33. The system according to claim 30, further comprising a frame for supporting the cutting system and the unloading system, and wherein the trim sweeping system comprises: air nozzles; air knives or a source of compressed air, mounted on the frame.]

[34. The system according to claim 30, wherein the trim sweep system comprising one or more blades mounted on the unloading system or mounted on a frame adjacent the conveyance system.]

35. A system for cutting portions from food products based on desired portion physical specifications resulting in one or more cut portions and remaining trim and then unloading the cut portions to separate the cut portions from the trim, comprising:

(a) a conveyor to convey the food products to be cut;

(b) a scanner for scanning the food products and generating data pertaining to the physical specifications of the food product and the location of the food product on the conveyor;

(c) a cutter for cutting the food products into portions of desired physical specifications;

(d) a carrier for supporting and carrying the cutter to move both along and transversely to the conveyor;

(e) an unloader carried by a powered actuator to move relative to the conveyor both along and transversely to the conveyor, said unloader comprising:

a suction head capable of connection to a vacuum stream from a vacuum source;

a screen disposed between the suction head and the vacuum source to restrict the size of portions of the food product capable of entering the vacuum stream;

the suction head capable of receiving pressurized fluid for directing the pressurized fluid at the screen in a direction toward the suction head; and (f) a controller operable to:

process the scanning data and portioning specification settings to determine the cut paths through which the cutter must be moved to achieve portions of desired physical specifications;

direct the cutter along the determined cut paths; and direct the unloader to pick up the cut portions and deposit the cut portions at desired locations based upon the location of the cut portions as determined by the scanning data.

36. The system according to claim 35, wherein the controller is also operable to direct the pressurized fluid at the screen in the direction toward the suction head.

37. The system according to claim 1, wherein the at least one powered unloading system comprises at least one vacuum-actuator connectable to a vacuum stream and configured to attach to the cut portions, said vacuum-actuator comprising a filter to restrict the size of the cut portions capable of entering the vacuum stream.

38. The system according to claim 1, wherein the control system processor controls the at least one powered unloading system to deposit the cut portions at specific locations based on the physical specifications of the cut portions.

[39. The system according to claim 20, wherein the plurality of vacuum actuators are operable to unload a plurality of cut portions from the conveyance system simultaneously.]

*40. A system for cutting portions from a workpiece based on desired physical specifications of the cut portions resulting in one or more cut portions and remaining trim, and then unloading the cut portions from a conveyance system, comprising:*

*(a) a scanning system for scanning the workpiece and generating data pertaining to physical specifications of the workpiece and to the location of the workpiece on the conveyance system;*

*(b) a cutting system for cutting one or more portions from the workpiece;*

*(c) at least one carrier system for supporting and moving the cutting system to cut the workpiece into portions per desired physical specifications;*

*(d) at least one powered unloading system operatively associated with the at least one carrier system, said unloading system operable to lift the cut portions off the conveyance system to deposit the cut portions at desired locations; and*

*(e) wherein the at least one powered unloading system comprises a suction head connectable in suction flow communication with a source of suction, said suction head having an inlet of a minimum width large enough to enable entry of the cut portions through the suction head;*

*(f) a control system processor operable to:*

*(i) process the scanning data and the desired physical specifications of the portions to determine the cutting paths required to cut the workpiece to achieve the desired physical specifications for the portions;*

*(ii) direct the at least one powered unloading system to pick up the cut portions from locations on the conveyance system as determined by the scanning data and deposit the cut portions at desired locations.*

*41. The system according to claim 40, wherein the cutting system is carried by a rotatable and extendable actuator located alongside the conveyance system.*

*42. The system according to claim 40, wherein the carrier system comprises an automated, multi-directional actuator system capable of moving at least along, across, and diagonally relative to the conveyance system.*

*43. The system according to claim 42, wherein the multi-directional actuator system is also capable of moving upward and downward relative to the conveyance system.*

*44. The system according to claim 40, wherein the cutting system is selected from the group consisting of high-speed fluid jets, high-speed water jets, laser beams, knives, and saws.*

*45. The system according to claim 40, wherein the control system processor is operable to control the cutting system to cut the food item; and then control one or both the unloading system and the conveyance system to pick up the cut portions of the food item from the conveyance system before the cut portions travel beyond the range of the unloading system.*

*46. In a system for cutting portions from a workpiece based on desired physical specifications of the cut portions resulting in one or more cut portions and remaining trim, an unloading system for unloading the cut portions from a conveyance system, comprising:*

*(a) a scanning system for scanning the workpiece and generating data pertaining to physical specifications of the workpiece and to the location of the workpiece on the conveyance system;*

*(b) at least one powered unloading system operable to lift the cut portions off the conveyance system to deposit the cut portions at desired locations; and*

*(c) wherein the at least one powered unloading system comprises a suction head connectable in suction flow communication with a source of suction, said suction*

*head having an inlet of a minimum width large enough to enable entry of the cut portions through the suction head;*

(*d*) *a control system processor operable to:*

(*i*) *process the scanning data and the desired physical specifications of the portions; and*

(*ii*) *direct the at least one powered unloading system to pick up the cut portions from locations on the conveyance system as determined by the scanning data and deposit the cut portions at desired locations.*

*47. The system according to claim 46, wherein the control system controls the unloading system for moving the suction head upward and downward relative to the conveyor system.*

*48. A system for cutting portions from a workpiece based on desired physical specifications of the cut portions resulting in one or more cut portions and trim, and then unloading the trim from a conveyance system, comprising:*

(*a*) *a scanning system for scanning the workpiece and generating data pertaining to physical specifications of the workpiece and to the location of the workpiece on the conveyance system;*

(*b*) *a cutting system for cutting one or more portions from the workpiece;*

(*c*) *at least one carrier system for supporting and moving the cutting system to cut the workpiece into portions per desired physical specifications;*

(*d*) *at least one powered unloading system operatively associated with the at least one carrier system, said unloading system operable to lift the trim off the conveyance system to deposit the trim at desired locations; and*

(*e*) *wherein the at least one powered unloading system comprises a suction head connectable in suction flow communication with a source of suction, said suction head having an inlet of a minimum width large enough to enable entry of the trim through the suction head;*

(*f*) *a control system processor operable to:*

(*i*) *process the scanning data and the desired physical specifications of the portions to determine the cutting paths required to cut the workpiece to achieve the desired physical specifications for the portions;*

(*ii*) *direct the at least one powered unloading system to pick up the trim from locations on the conveyance system as determined by the scanning data and deposit the trim at desired locations.*

*49. The system according to claim 48, wherein the carrier system comprises an automated, multi-directional actuator system capable of moving at least along, across, and diagonally relative to the conveyance system.*

*50. The system according to claim 49, wherein the multi-directional actuator system is also capable of moving upward and downward relative to the conveyance system.*

*51. The system according to claim 48, wherein the control system processor is operable to control the cutting system to cut the food item; and then control one or both the unloading system and the conveyance system to pick up the trim of the food item from the conveyance system before the trim travels beyond the range of the unloading system.*

* * * * *